US012705363B2

(12) United States Patent
Borcherdt, III

(10) Patent No.: US 12,705,363 B2
(45) Date of Patent: Aug. 11, 2026

(54) SYSTEMS AND METHODS FOR VULNERABILITY DETECTION AND MITIGATION USING ARTIFICIAL INTELLIGENCE IN AN ELECTRONIC ENVIRONMENT

(71) Applicant: BANK OF AMERICA CORPORATION, Charlotte, NC (US)

(72) Inventor: Frederick Borcherdt, III, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 16 days.

(21) Appl. No.: 18/893,466

(22) Filed: Sep. 23, 2024

(65) Prior Publication Data

US 2026/0087142 A1 Mar. 26, 2026

(51) Int. Cl.
*G06F 21/57* (2013.01)
*H04L 9/40* (2022.01)

(52) U.S. Cl.
CPC ........ *G06F 21/577* (2013.01); *H04L 63/1425* (2013.01)

(58) Field of Classification Search
CPC ... G06F 21/577; G06F 7/023; H04L 63/1425; H04L 41/16; G06N 20/00; H04N 21/251; H04N 21/466; H04N 21/45; H04N 21/4662
See application file for complete search history.

(56) References Cited

U.S. PATENT DOCUMENTS 8,756,698 B2 6/2014 Sidagni
8,813,235 B2 8/2014 Sidagni
9,253,202 B2 2/2016 Thakur
9,516,064 B2 12/2016 Lietz
10,277,619 B1 4/2019 Clark, II
10,469,517 B1 11/2019 Higbee
10,637,884 B2 4/2020 Apple
11,055,652 B1 * 7/2021 Kannan .................. G06N 20/00
11,165,808 B2 11/2021 Murthy
11,373,117 B1 * 6/2022 Cui ....................... G06F 16/285
11,522,899 B2 12/2022 Somasundaram
11,676,087 B2 6/2023 Hogg
12,028,368 B1 7/2024 Cohen
12,058,160 B1 * 8/2024 Erlingsson ............ G06F 16/906
12,072,986 B2 8/2024 Starr
12,107,869 B1 * 10/2024 Kannan .................. H04L 63/20
12,113,810 B2 10/2024 Hariri
(Continued)

*Primary Examiner* — Michael Won
(74) *Attorney, Agent, or Firm* — Moore & Van Allen PLLC; Mike Papakonstantinou

(57) ABSTRACT

Systems, computer program products, and methods are described herein for vulnerability detection and mitigation using artificial intelligence (AI) in an electronic environment. The present disclosure is directed to a system that receives data from at least one data source and generates at least one vulnerability attribute of a network device based on at least the data. In addition, the system applies the vulnerability attribute to an AI engine. Using the AI engine, the system assigns at least one weight to the vulnerability attribute of the network device. After the at least one weight is assigned, the system generates, using the AI engine, a vulnerability matrix of the network device based on the at least one weight.

18 Claims, 14 Drawing Sheets

(56) References Cited

U.S. PATENT DOCUMENTS

| | | | | |
|---|---|---|---|---|
| 2010/0125663 | A1 | 5/2010 | Donovan | |
| 2020/0358792 | A1 | 11/2020 | Bazalgette | |
| 2022/0382876 | A1 | 12/2022 | Zeng | |
| 2024/0106838 | A1 | 3/2024 | Gasiorek | |
| 2024/0289465 | A1 | 8/2024 | Zech | |
| 2024/0348638 | A1 | 10/2024 | Tejvir | |
| 2024/0403428 | A1 | 12/2024 | Lal | |
| 2024/0403445 | A1 | 12/2024 | Straub | |
| 2025/0291942 | A1* | 9/2025 | McLaughlin, III .... | G06N 20/00 |

* cited by examiner

SYSTEMS AND METHODS FOR VULNERABILITY DETECTION AND MITIGATION USING ARTIFICIAL INTELLIGENCE IN AN ELECTRONIC ENVIRONMENT

TECHNOLOGICAL FIELD

Example embodiments of the present disclosure relate to vulnerability detection and mitigation using artificial intelligence (AI) in an electronic environment.

BACKGROUND

Dynamic and complex rule regimes for electronic environments impact operational execution, including efficiency, system vulnerability remediation, and technical resource allocation. Rule authorities issue binding rules that necessitate adherence and compliance, including detecting technical component vulnerabilities and taking appropriate remediation steps. In addition, system vulnerabilities pose a threat to the electronic environment, including to network devices and applications, which may result in data security vulnerabilities and inadequate security access controls. Vulnerabilities from security threats may result in misappropriated access, malicious actions, and/or data breaches. System vulnerabilities may also create network load imbalances within an electronic environment if a subset of network devices is compromised, sequestered, or reallocated following detected vulnerabilities, which can overload the remaining network devices. However, detecting and mitigating technical component vulnerabilities and system vulnerabilities within electronic environments is inefficient, consumes technical resources, and/or requires technical expertise of the impacted technical components. Furthermore, ongoing monitoring and vulnerability reporting is also problematic due to constantly changing rules.

With the increase in rule requirements, it is essential to develop efficient methods for creating effective operational models to satisfy the rule requirements while meeting technical operational goals. Conventional solutions often rely on manual analysis and configuration, which can be time-consuming, error-prone, inefficient, and may not adapt well to rapidly changing rule regimes and technological innovation.

Applicant has identified a number of deficiencies and problems associated with vulnerability detection and mitigation using AI in an electronic environment. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for vulnerability detection and mitigation using AI in an electronic environment.

In one aspect, a system for vulnerability detection and mitigation using artificial intelligence in an electronic environment is provided. In some embodiments, the system may comprise: a memory device with computer-readable program code stored thereon; at least one processing device, wherein executing the computer-readable program code is configured to cause the at least one processing device to: receive data from at least one data source; generate at least one vulnerability attribute of a network device based on at least the data; apply the vulnerability attribute to an AI engine; assign, by the AI engine, at least one weight to the vulnerability attribute of the network device; and generate, by the AI engine, a vulnerability matrix of the network device based on the at least one weight.

In some embodiments, the data comprises at least one of a compliance data or a regulatory data associated with at least one of network criteria, application criteria, infrastructure criteria, or policy criteria.

In some embodiments, executing the computer-readable program code is further configured to cause the at least one processing device to: generate a forecast engine, wherein the forecast engine comprises a forecast machine learning model; update the forecast engine with the data and the vulnerability matrix; and generate, using the forecast engine, a vulnerability forecasting map.

In some embodiments, executing the computer-readable program code is further configured to cause the at least one processing device to: identify, using a natural language processing (NLP) model, regulatory parameters associated with the data; extract operational data from at least one internal database; generate, using a machine learning (ML) model, a rule threat map based on the regulatory parameters and the operational data; and determine, using the AI engine, remediation recommendations based on the rule threat map.

In some embodiments, executing the computer-readable program code is further configured to cause the at least one processing device to: receive network data packets, wherein the network data packets comprise aggregated vulnerability data; determine, using the AI engine, rule anomalies based on at least the aggregated vulnerability data; create, using the AI engine, a prioritized hierarchy of the rule anomalies based on the vulnerability matrix, wherein the vulnerability matrix comprises vulnerability criteria and a vulnerability threshold; and generate, using the AI engine, a vulnerability matrix remediation based on the prioritized hierarchy of rule anomalies.

In some embodiments, executing the computer-readable program code is further configured to cause the at least one processing device to: receive at least one historical dataset; train the AI engine based on at least one historical dataset, wherein the at least one historical dataset comprises at least one of historical regulatory parameters associated with historical compliance data, historical vulnerability attributes associated with the network device, historical operational objectives associated with historical operational data, historical weights associated with historical vulnerability attributes, or historical vulnerability matrices; receive the aggregated vulnerability data; update the at least one historical dataset with the aggregated vulnerability data; and retrain the AI engine based on the aggregated vulnerability data.

In some embodiments, executing the computer-readable program code is further configured to cause the at least one processing device to: execute the vulnerability matrix remediation; determine, using the AI engine, a confidence threshold associated the vulnerability matrix remediation; compare the confidence threshold to the vulnerability threshold to determine a rule anomaly remediation score; and update the vulnerability matrix with the confidence threshold associated with the vulnerability matrix remediation.

In some embodiments, executing the computer-readable program code is further configured to cause the at least one processing device to: identify, using the AI engine, a rule vulnerability attribute based on the data; identify, using the AI engine, an operational vulnerability attribute; assign, using the AI engine, a rule vulnerability weight for the rule vulnerability attribute and an operational weight for the operational vulnerability attribute; and generate, using the AI engine, a composite vulnerability weight based on the rule vulnerability weight and the operational weight.

In some embodiments, executing the computer-readable program code is further configured to cause the at least one processing device to: generate a user interface on a display, wherein the user interface comprises at least one interactive dashboard; and generate at least one alert based on the vulnerability matrix.

In some embodiments, executing the computer-readable program code is further configured to cause the at least one processing device to: receive control signals from a user device, wherein the control signals comprise a revised mode of the AI engine, a second vulnerability attribute, and a second weight; update the AI engine based on the control signals; and modify the vulnerability matrix.

In another aspect, a computer program product for vulnerability detection and mitigation using artificial intelligence in an electronic environment is provided. In some embodiments, the computer program product comprises at least one non-transitory computer-readable medium having computer-readable program code portion embodied therein, the computer-readable program code portions which when executed by a processing device are configured to cause a processor to: receive data from at least one data source; generate at least one vulnerability attribute of a network device based on at least the data; apply the vulnerability attribute to an artificial intelligence (AI) engine; assign, by the AI engine, at least one weight to the vulnerability attribute of the network device; and generate, by the AI engine, a vulnerability matrix of the network device based on the at least one weight.

In some embodiments, the data comprises regulatory data associated with at least one of network criteria, application criteria, infrastructure criteria, and policy criteria.

In some embodiments, the processing device is further configured to: generate a forecast engine, wherein the forecast engine comprises a forecast machine learning model; update the forecast engine with the data and the vulnerability matrix; and generate, using the forecast engine, a vulnerability forecasting map.

In some embodiments, the processing device is further configured to: identify, using a natural language processing model, regulatory parameters associated with the data; extract operational data from at least one internal database; generate, using a machine learning (ML) model, a rule threat map based on the regulatory parameters and the operational data; and determine, using the AI engine, remediation recommendations based on the rule threat map.

In some embodiments, the processing device is further configured to: receive network data packets, wherein the network data packets comprise aggregated vulnerability data; determine, using the AI engine, rule anomalies based on at least the aggregated vulnerability data; create, using the AI engine, a prioritized hierarchy of the rule anomalies based on the vulnerability matrix, wherein the vulnerability matrix comprises vulnerability criteria and a vulnerability threshold; and generate, using the AI engine, a vulnerability matrix remediation based on the prioritized hierarchy of rule anomalies.

In some embodiments, wherein the processing device is further configured to: identify, using the AI engine, a rule vulnerability attribute based on the data identify, using the AI engine, an operational vulnerability attribute; assign, using the AI engine, a rule vulnerability weight for the rule vulnerability attribute and an operational weight for the operational vulnerability attribute; and generate, using the AI engine, a composite vulnerability weight based on the rule vulnerability weight and the operational weight.

In some embodiments, the processing device is further configured to: execute the vulnerability matrix remediation; determine, using the AI engine, a confidence threshold associated the vulnerability matrix remediation; compare the confidence threshold to the vulnerability threshold to determine a rule anomaly remediation score; and update the vulnerability matrix with the confidence threshold associated with the vulnerability matrix remediation.

In some embodiments, the processing device is further configured to: receive control signals from a user device, wherein the control signals comprise a revised mode of the AI engine, a second vulnerability attribute, and a second weight; update the AI engine based on the control signals; and modify the vulnerability matrix.

In another aspect, a computer-implemented method for vulnerability detection and mitigation using artificial intelligence in an electronic environment is provided. In some embodiments, the computer-implemented method comprising: receiving data from at least one data source; generating at least one vulnerability attribute of a network device based on at least the data; applying the vulnerability attribute to an AI engine; assigning, by the AI engine, at least one weight to the vulnerability attribute of the network device; and generating, by the AI engine, a vulnerability matrix of the network device based on the at least one weight.

In some embodiments, the computer-implemented method is further configured for: identifying, using a natural language processing model, regulatory parameters associated with the data; extracting operational data from at least one internal database; generating, using a ML model, a rule threat map based on the regulatory parameters and the operational data; and determining, using the AI engine, remediation recommendations based on the rule threat map.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
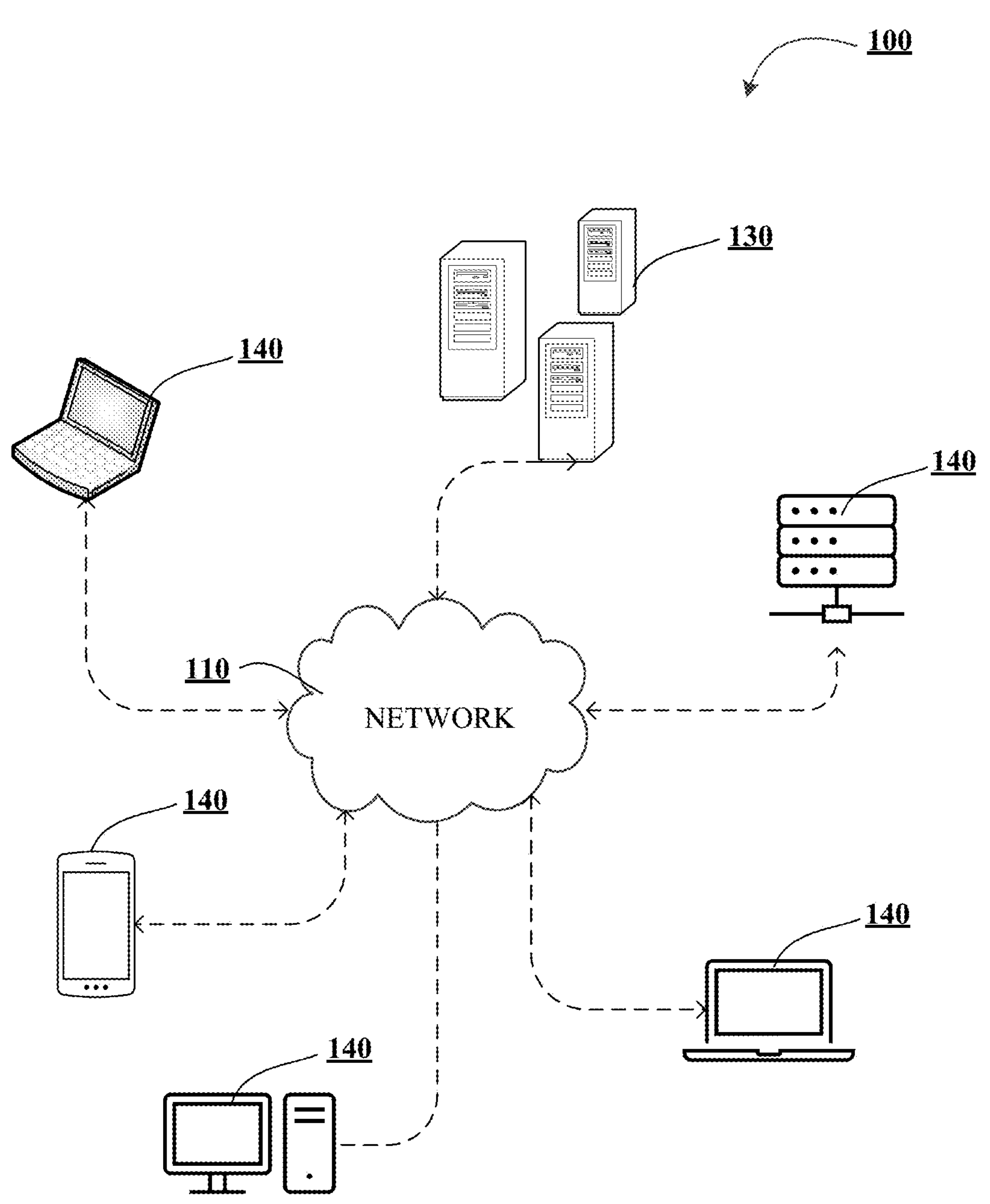
Figure 1B:
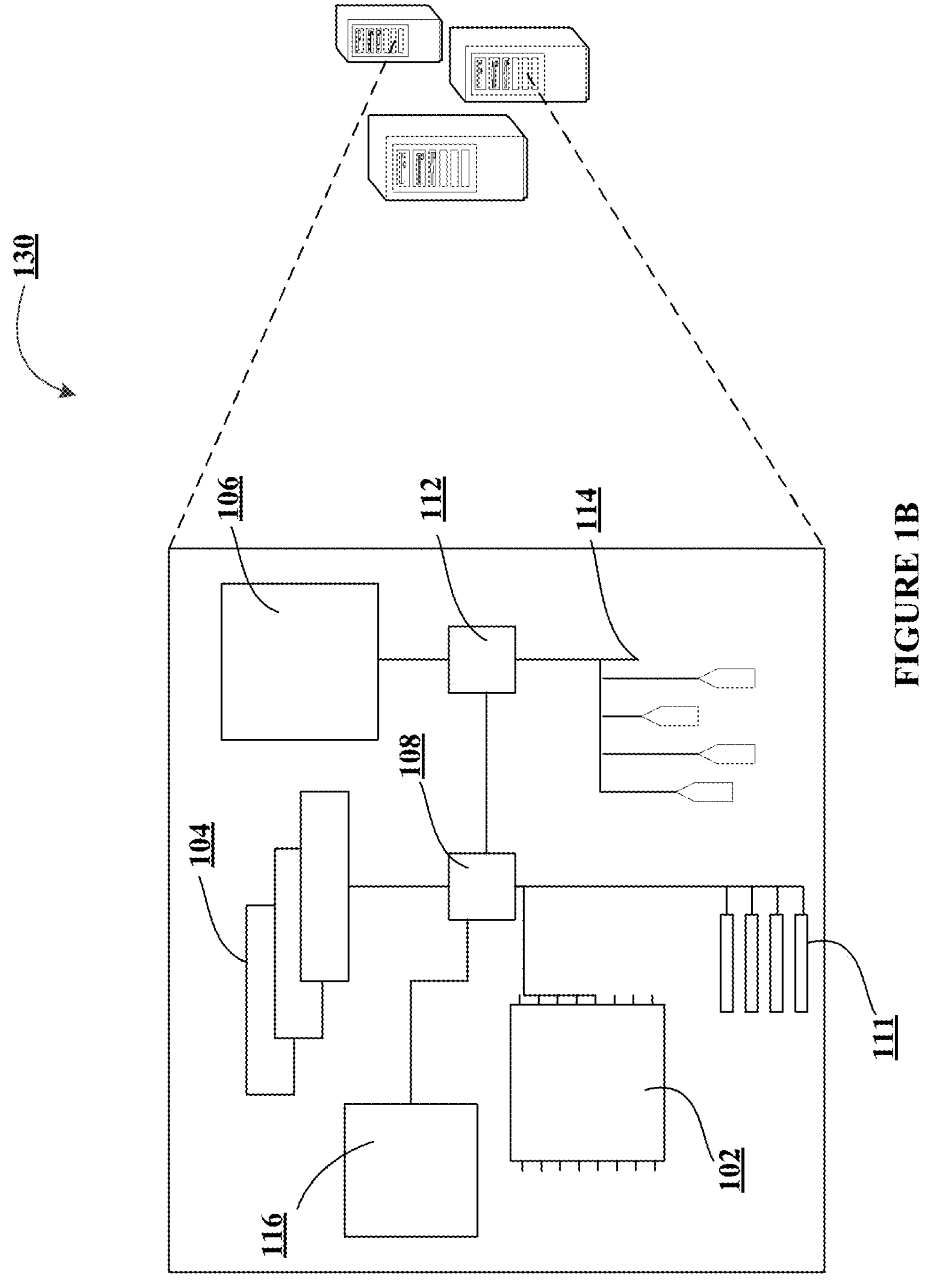
Figure 1C:
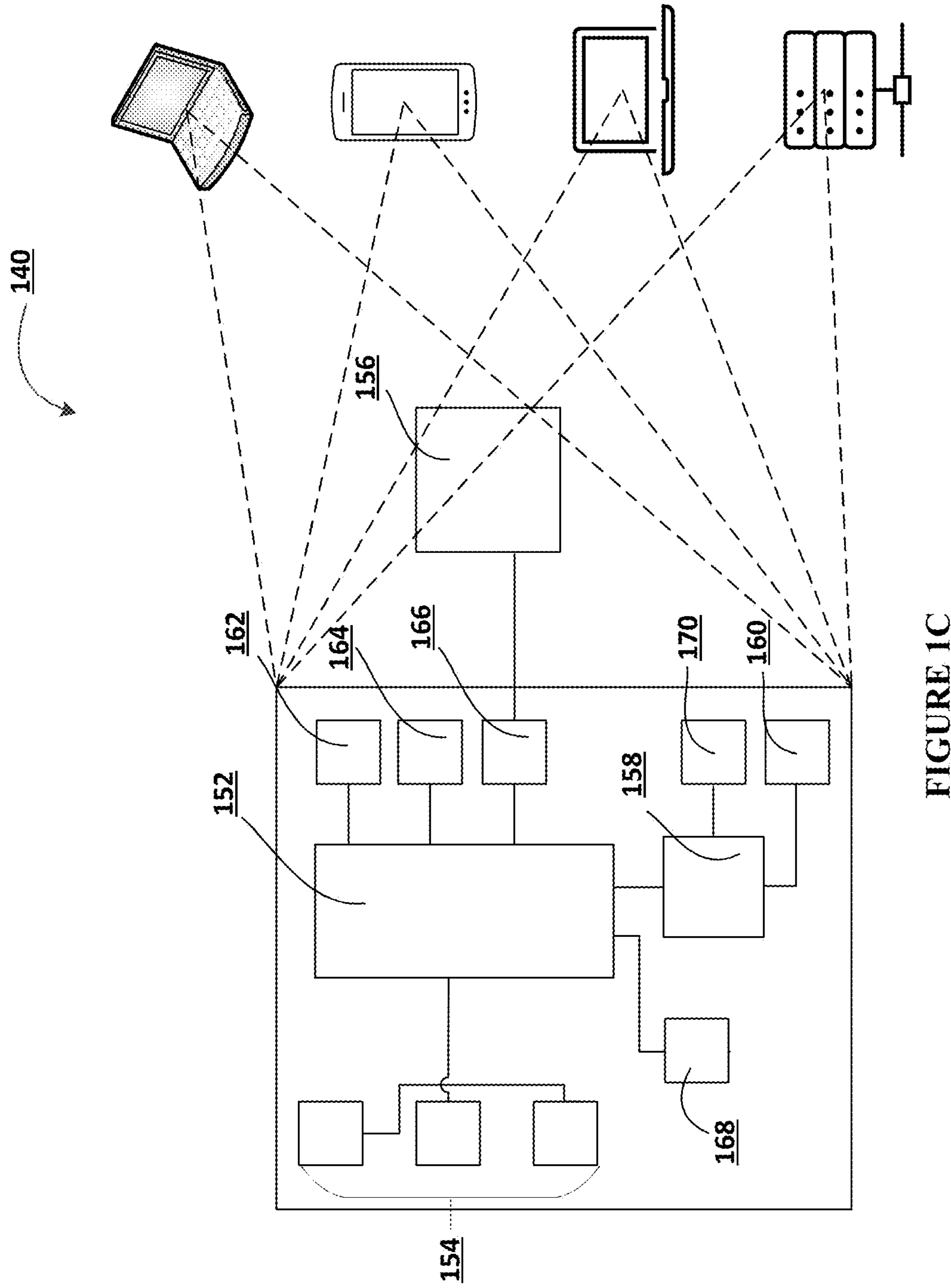
Figure 2:
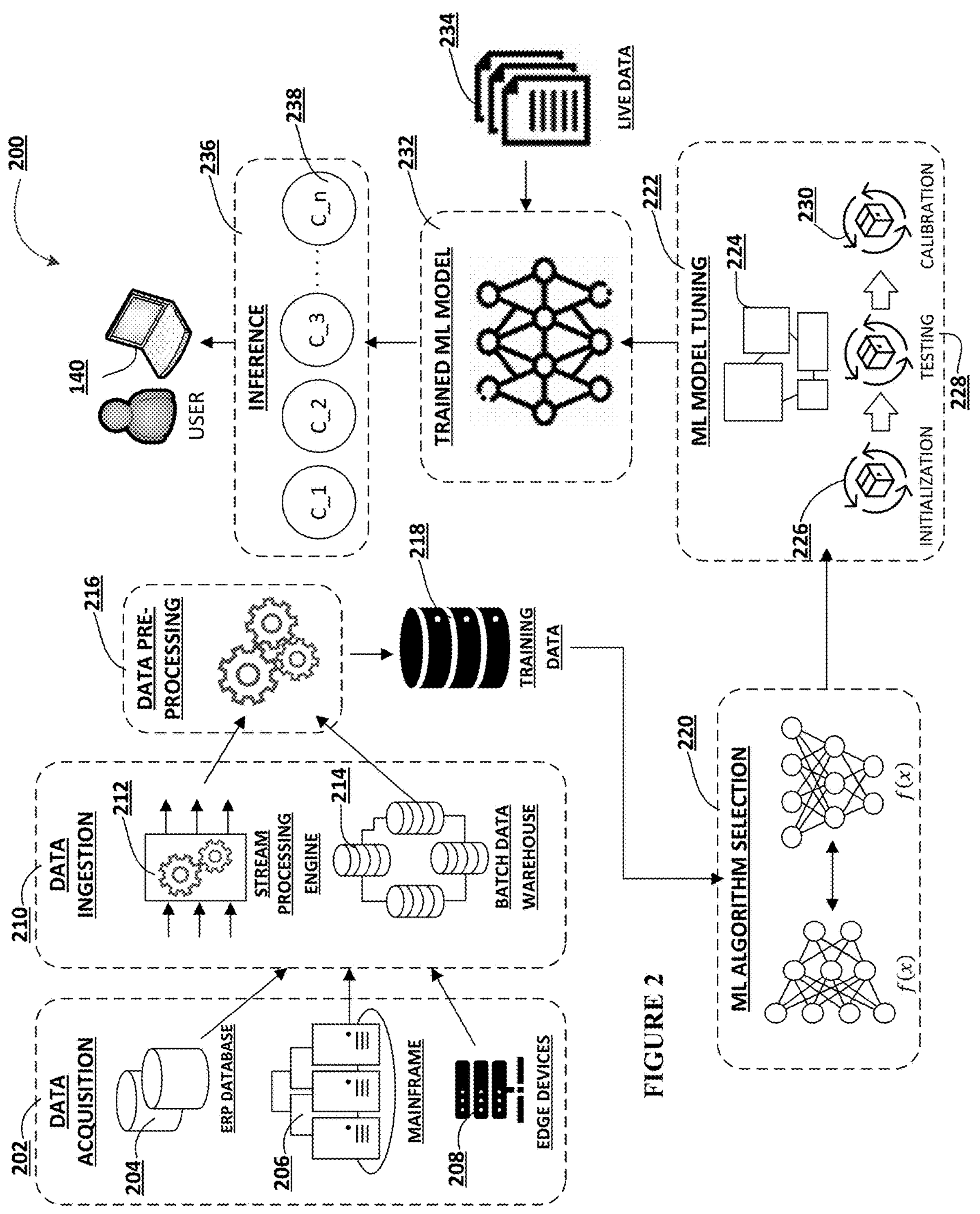
Figure 3:
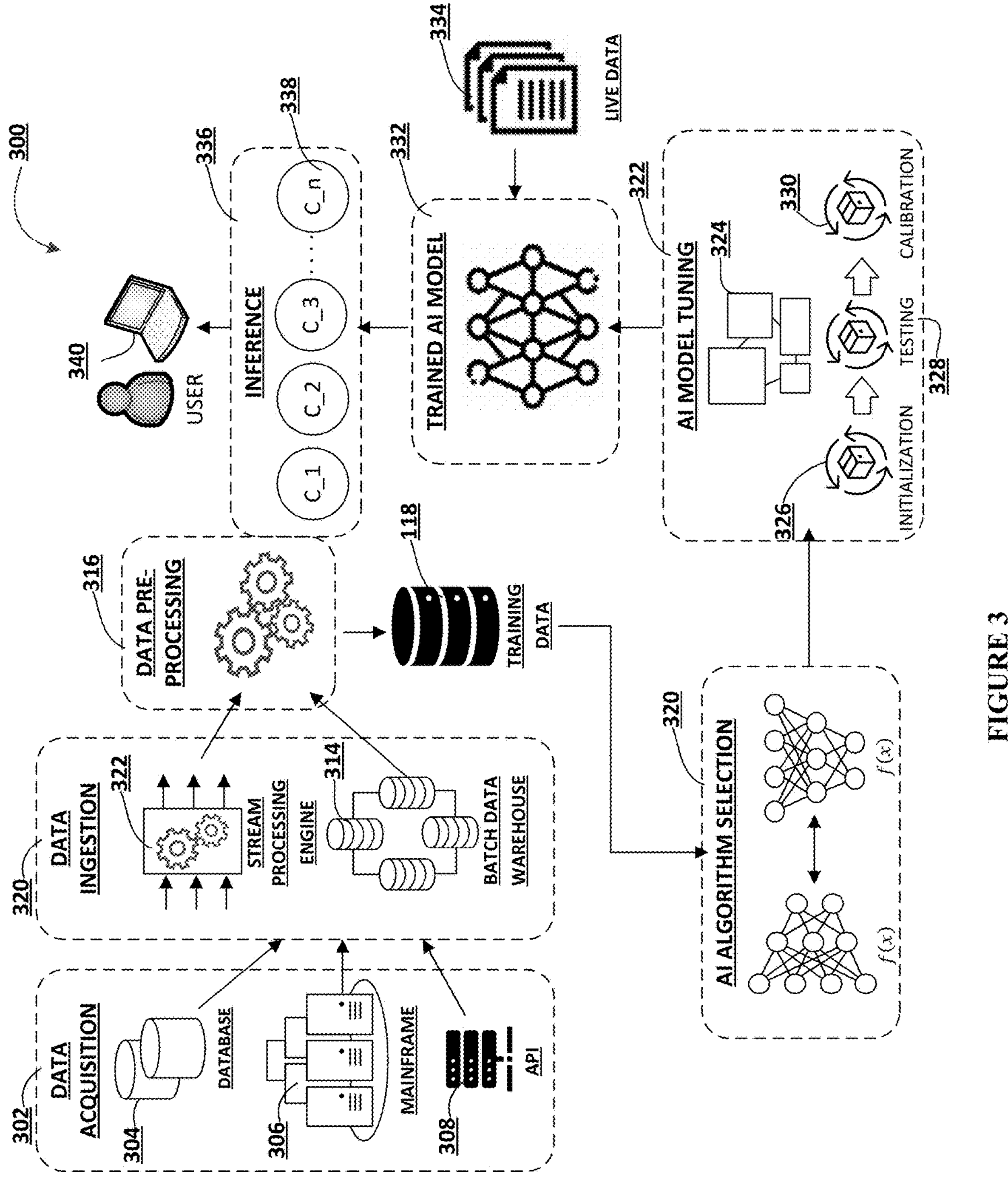
Figure 4:
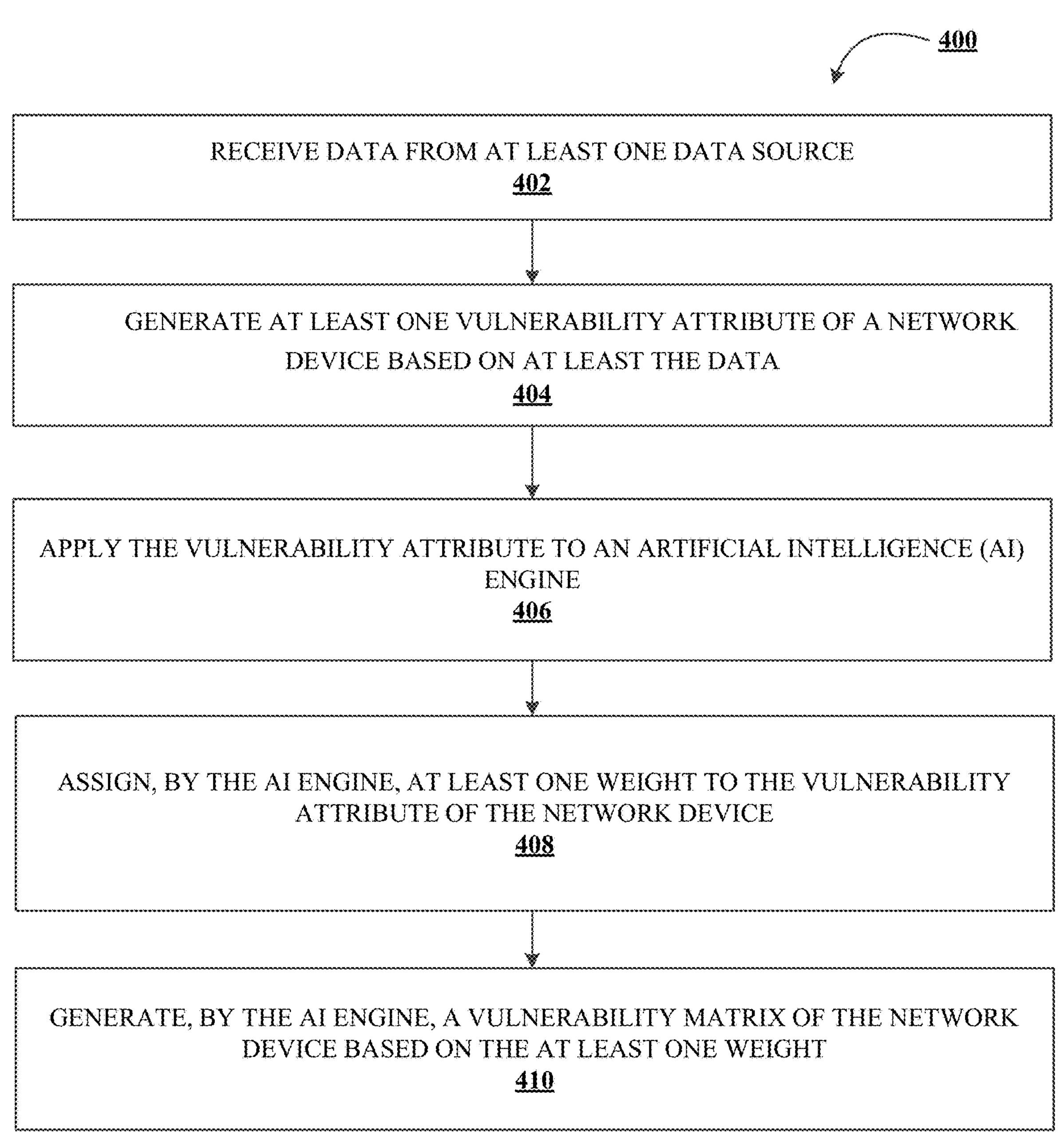
Figure 5:
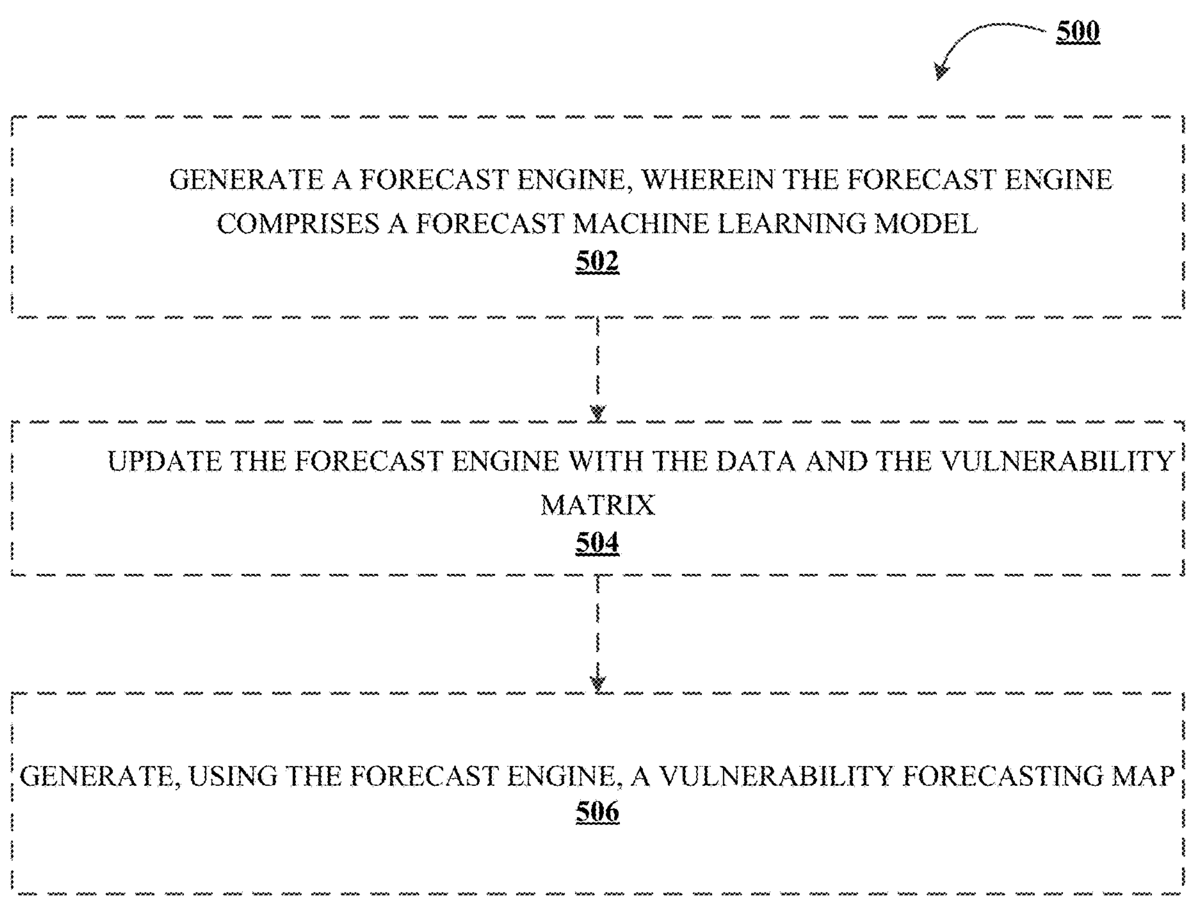
Figure 6:
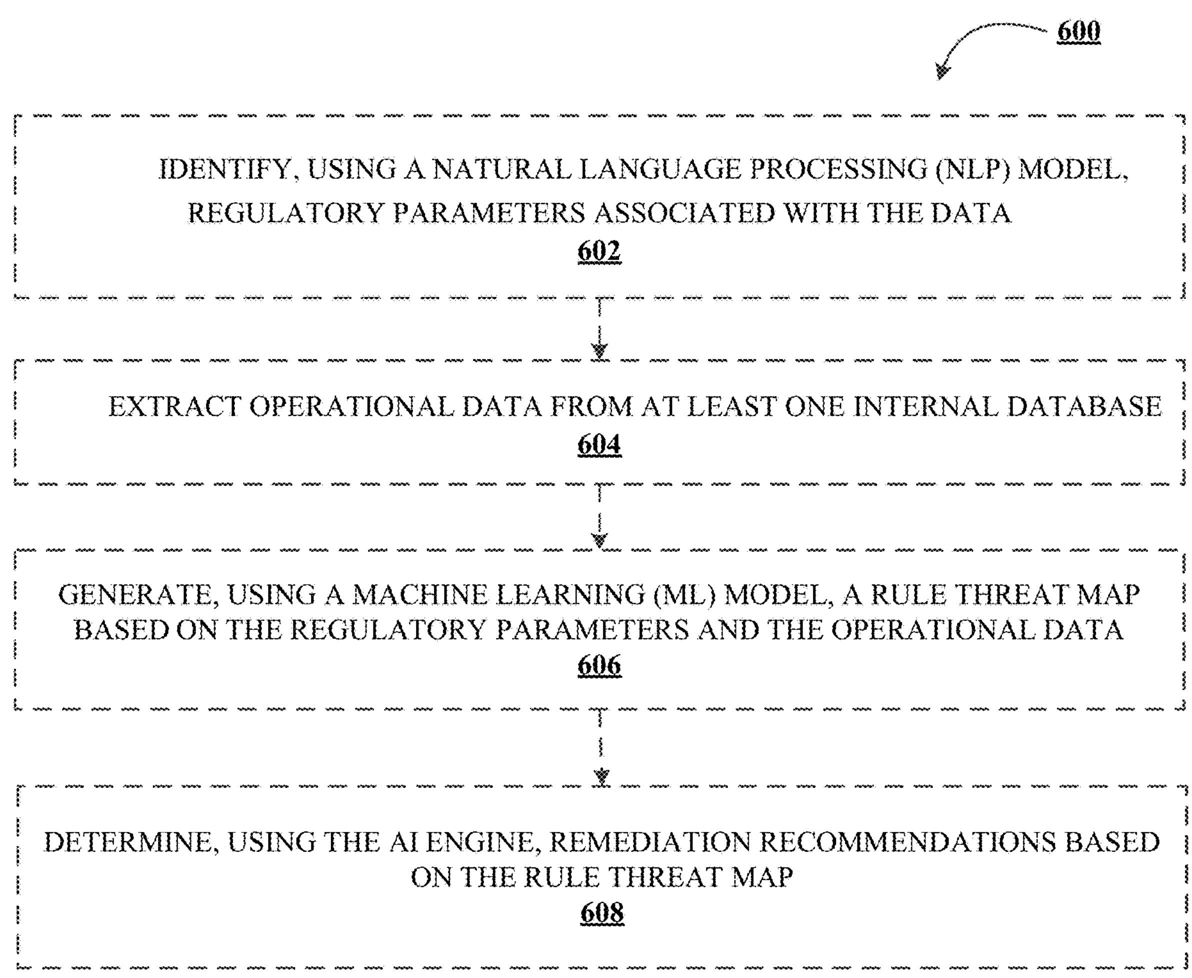
Figure 7:
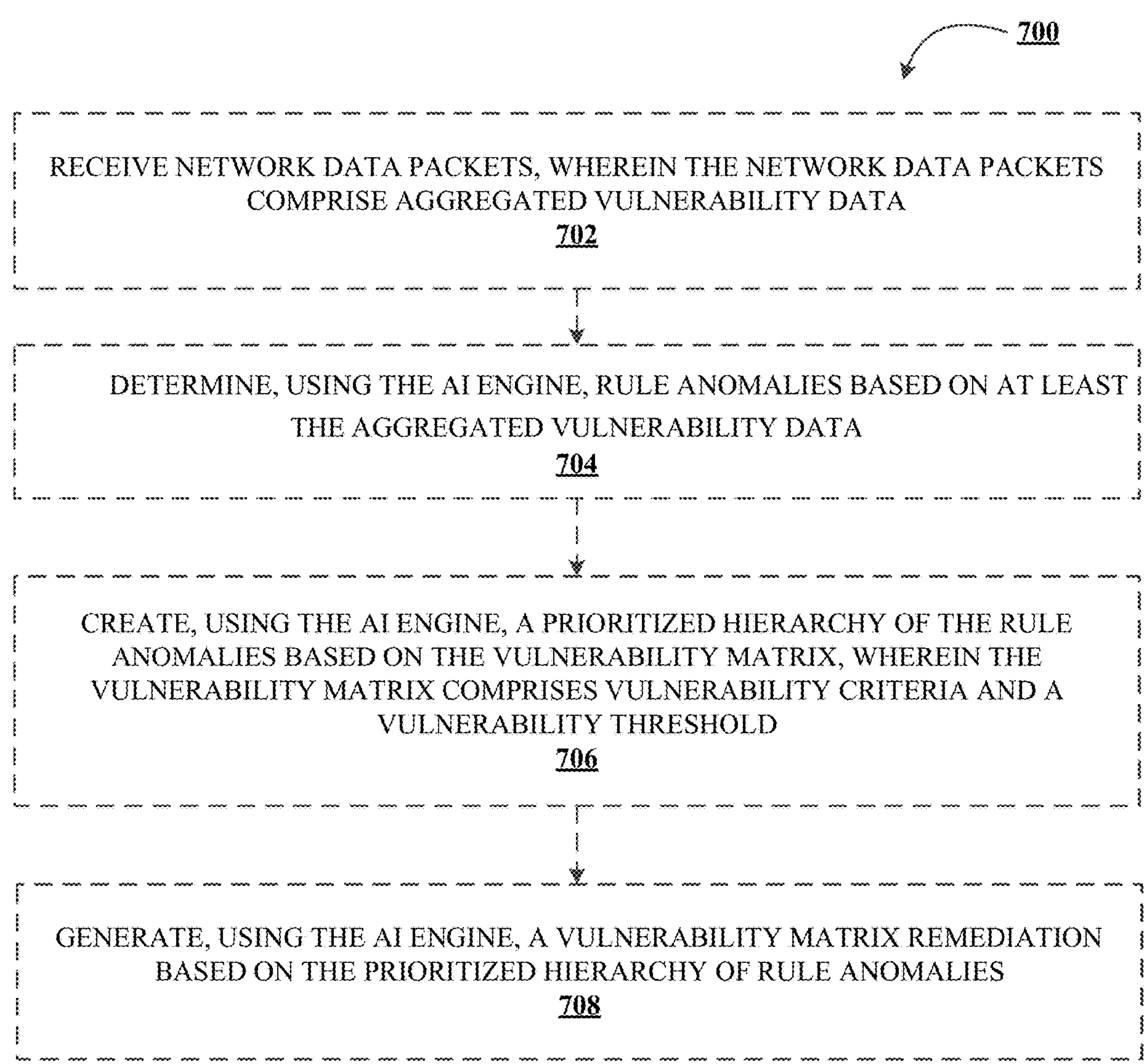
Figure 8:
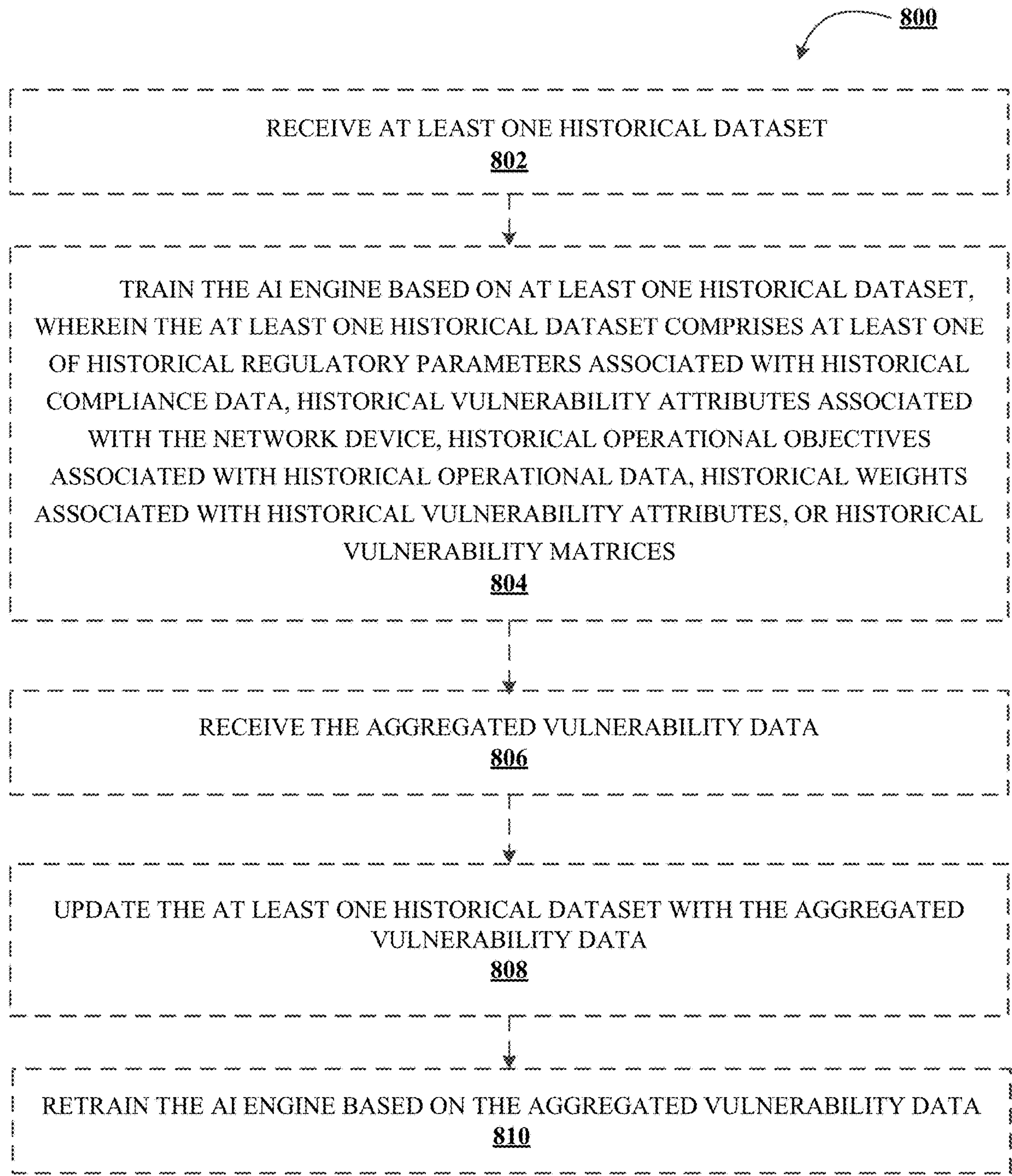
Figure 9:
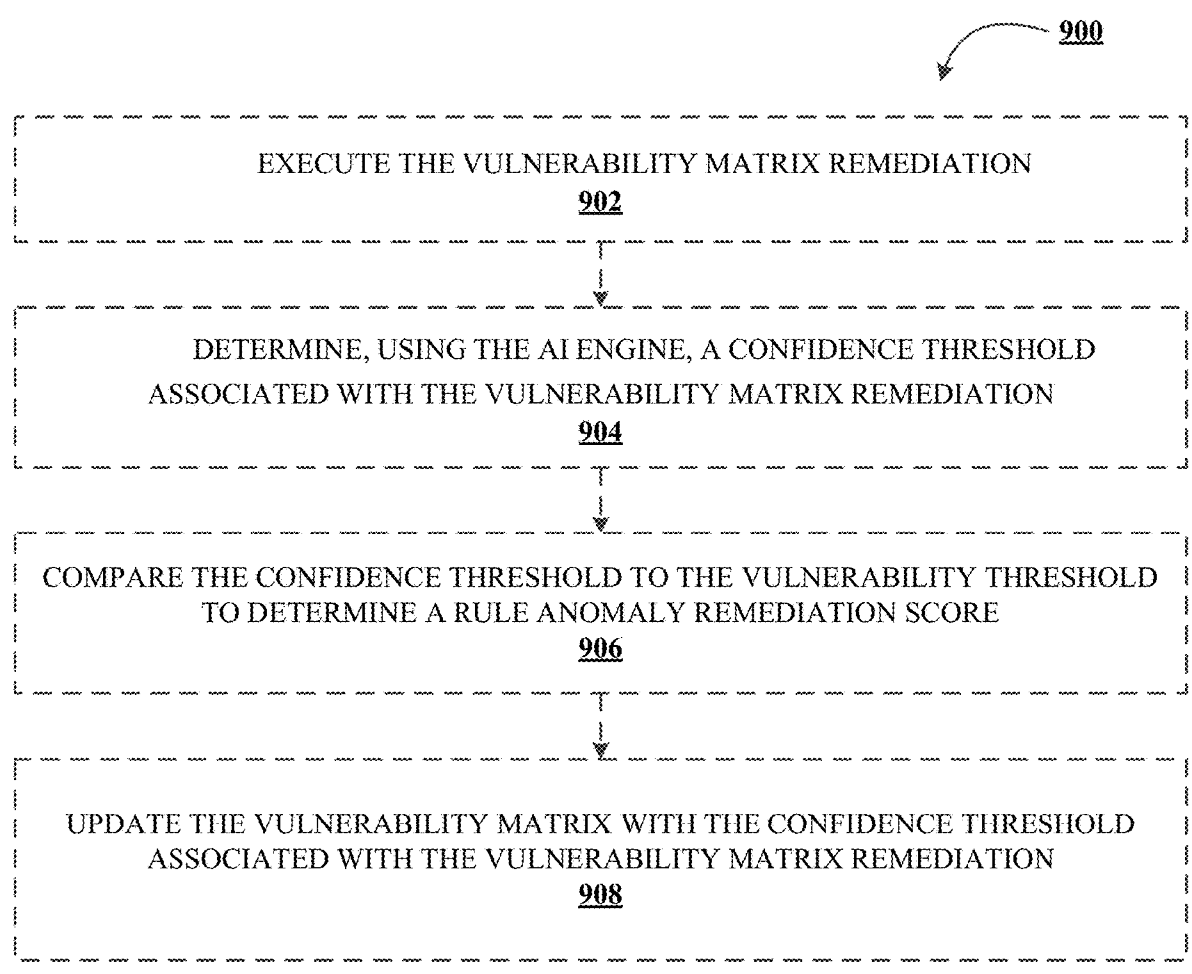
Figure 10:
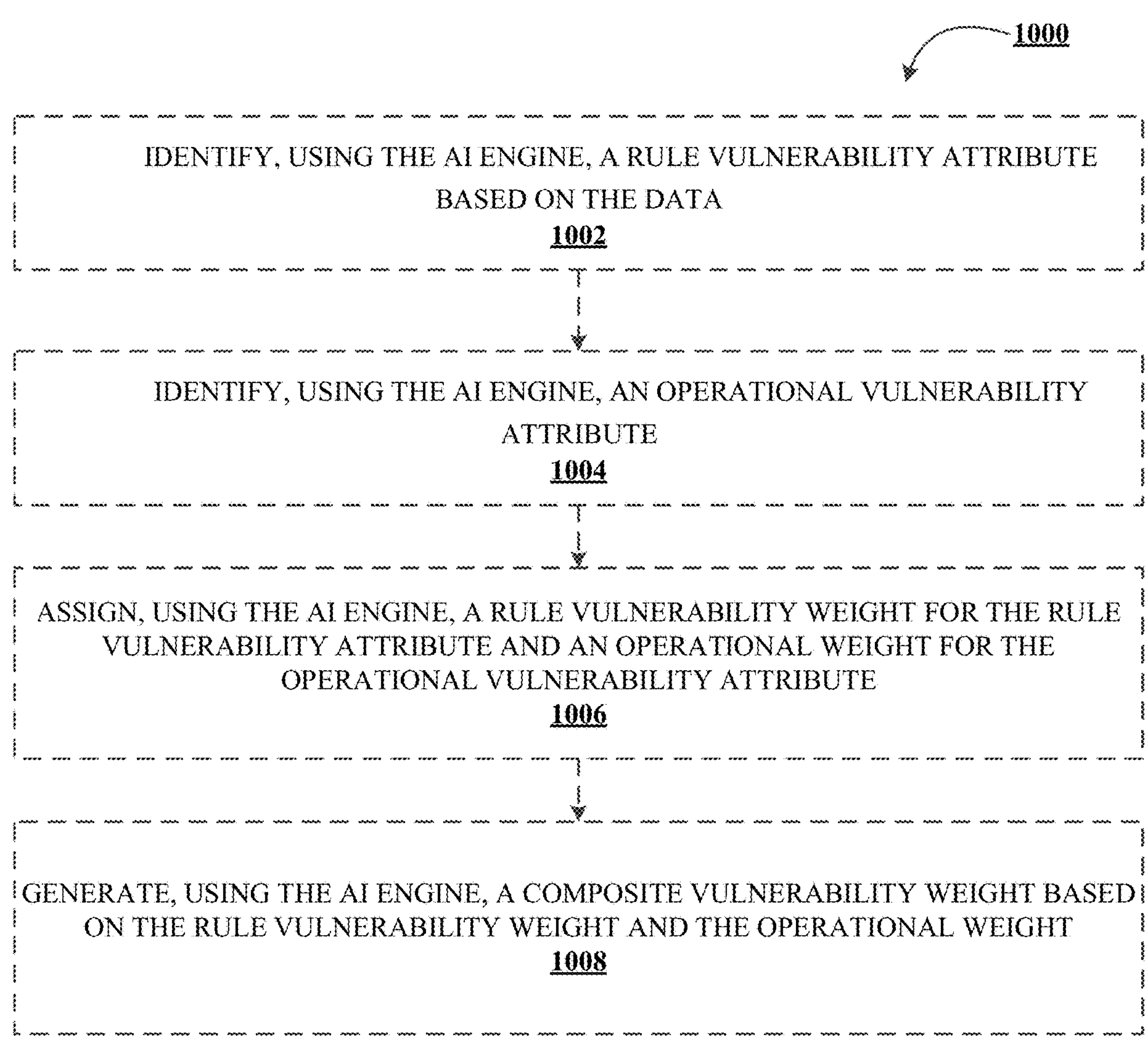
Figure 11:
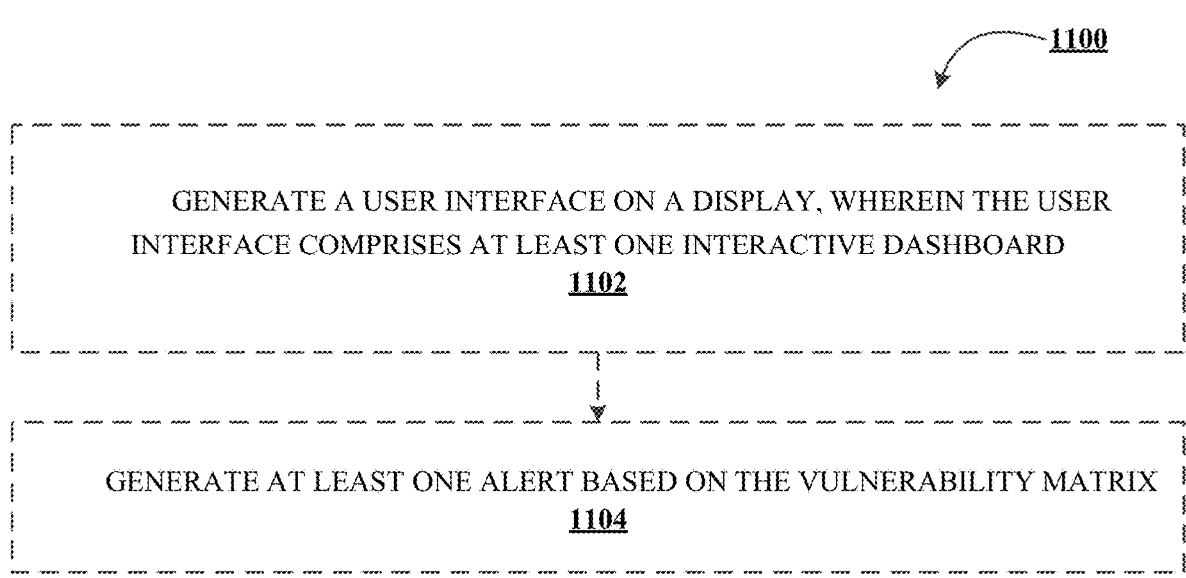
Figure 12:
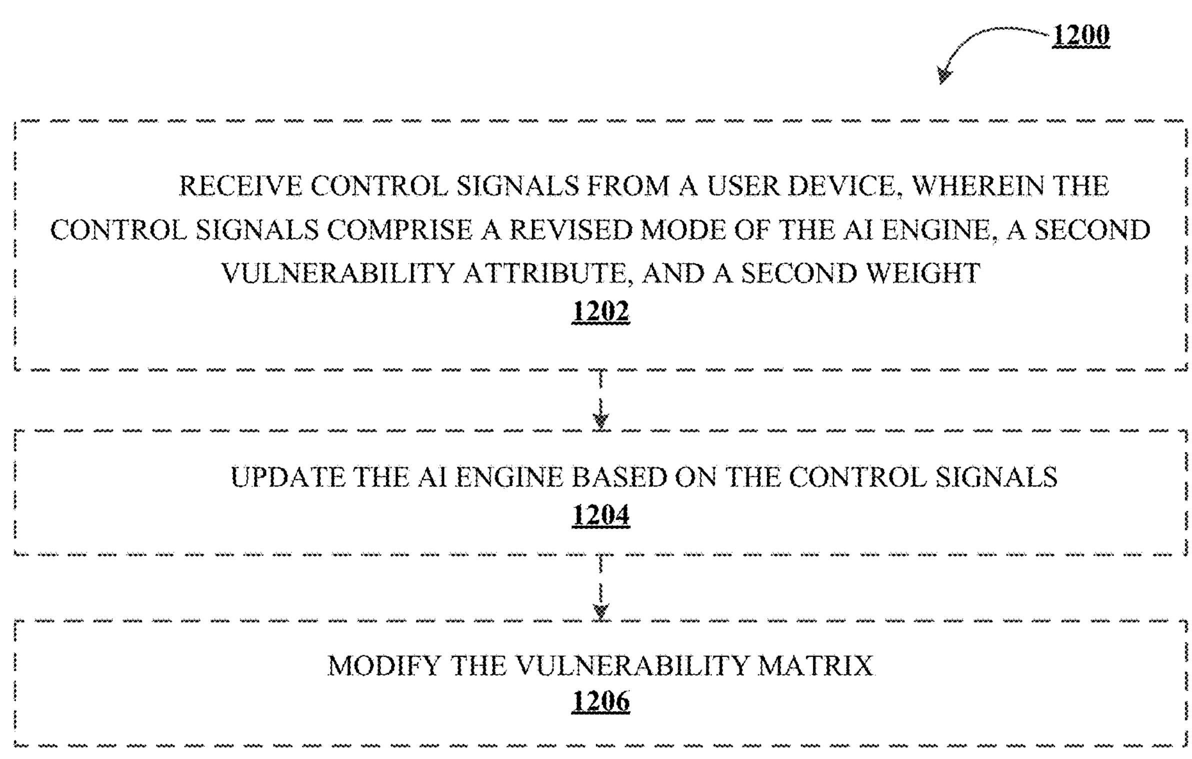

FIGS. 1A-1C illustrates technical components of an exemplary distributed computing environment for vulnerability detection and mitigation using AI in an electronic environment, in accordance with an embodiment of the disclosure;

FIG. 2 illustrates technical components of an exemplary ML environment, in accordance with an embodiment of the disclosure;

FIG. 3 illustrates an exemplary artificial intelligence (AI) engine subsystem architecture, in accordance with an embodiment of the disclosure;

FIG. 4 illustrates a process flow for vulnerability detection and mitigation using AI in an electronic environment, in accordance with an embodiment of the disclosure;

FIG. 5 illustrates a process flow for generating a vulnerability forecasting map, in accordance with an embodiment of the disclosure;

FIG. 6 illustrates a process flow for determining, using the AI engine, remediation recommendations based on the rule threat map, in accordance with an embodiment of the disclosure;

FIG. 7 illustrates a process flow for generating, using the AI engine, a vulnerability matrix remediation based on the prioritized hierarchy of rule anomalies, in accordance with an embodiment of the disclosure;

FIG. 8 illustrates a process flow for training and retraining the AI engine based on at least one historical dataset and the aggregated vulnerability data, in accordance with an embodiment of the disclosure;

FIG. 9 illustrates a process flow for updating the vulnerability matrix with the confidence threshold associated with the vulnerability matrix remediation, in accordance with an embodiment of the disclosure;

FIG. 10 illustrates a process flow for generating, using the AI engine, a composite vulnerability weight based on the rule vulnerability weight and the operational weight, in accordance with an embodiment of the disclosure;

FIG. 11 illustrates a process flow for generating a user interface and generating least one alert based on the vulnerability matrix, in accordance with an embodiment of the disclosure; and FIG. 12 illustrates a process flow for modifying the vulnerability matrix, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present disclosure provides a solution to the above-referenced problems in the field of technology by providing vulnerability detection and mitigation using AI in an electronic environment which is designed to autonomously, accurately, efficiently, and on a large-scale generate at least one vulnerability matrix of at least one network device based on weighing of vulnerability attributes and data, which may comprise rule data and technical operational data. The system may receive data from at least one source, a plurality of external and/or internal sources, and/or the like, to determine vulnerability threats. Such a vulnerability detection and mitigation system may comprise an AI engine which may be trained with data associated with the rule data and the technical operational data to determine at least one vulnerability attribute of a network device based on at least the data. The present disclosure solves the above technical problems by implementing the vulnerability detection and mitigation system—like that shown as system 130 herein—by assigning, using the AI engine, at least one weight to the vulnerability attribute of the network device. The weight may determine the vulnerability threat of the vulnerability attribute, wherein the vulnerability threat may comprise regulatory threats, technical operational threats, and/or the like. In this manner, the vulnerability detection and mitigation system may generate, using the AI engine, a vulnerability matrix of the network device based on the at least one weight. In this respect, the vulnerability detection and mitigation system receives data from at least one data source, generates at least one vulnerability attribute of a network device based on at least the data, applies the vulnerability attribute to an AI engine, assigns, by the AI engine, at least one weight to vulnerability attribute of the network device, and generates, by the AI engine, a vulnerability matrix of the network device.

Accordingly, the present disclosure provides vulnerability detection and mitigation using AI in an electronic environment. For instance, complex regulatory regimes applicable to electronic environments may impact technical operational execution. Determining compliance issues and adjusting technical operations is error-prone, time-consuming, and inefficient, resulting in large resource spend and suboptimal technical resource allocation. The system receives rules data and generates a vulnerability attribute of a network device based on the rules data. The system applies a vulnerability attribute to an AI engine and uses the AI engine to assign a weight to the vulnerability attribute. The AI engine generates a vulnerability matrix of the network device based on the weight.

What is more, the present disclosure provides a technical solution to a technical problem. As described herein, the technical problem includes dynamic, autonomous, and accurate vulnerability threat detection and mitigation in electronic environments. The technical solution presented herein allows for an automated vulnerability threat detection and mitigation system in electronic environments by harnessing an AI engine to determine in real-time if rule anomalies exist within the electronic environment. In particular, the vulnerability detection and mitigation system is an improvement over existing solutions to detecting vulnerability threats and executing remediation responses (i) with fewer steps to achieve the solution, thus reducing the amount of computing resources, such as processing resources, storage resources, network resources, and/or the like, that are being used (e.g., by autonomously determining vulnerability threat requirements for the electronic environment, continuously monitoring the electronic environment, and/or dynamically detecting vulnerability threats); (ii) providing a more accurate solution to problem, thus reducing the number of resources required to remedy any errors made due to a less accurate solution (e.g., by intelligently generating remediation recommendations comprising remediation response actions); (iii) removing manual input and waste from the implementation of the solution, thus improving speed and efficiency of the process and conserving computing resources (e.g., by mapping rules data to operational data to determine threats within the network devices of the electronic environment); and (iv) determining an optimal amount of resources that need to be used to implement the solution, thus reducing network traffic and load on existing computing resources (e.g., by dynamically providing a prioritized vulnerability remediation matrix for remediating vulnerability threats). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for vulnerability detection and mitigation using artificial intelligence in an electronic environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary artificial intelligence (AI) engine subsystem architecture 300, in accordance with an embodiment of the disclosure. The artificial intelligence subsystem 300 may include a data acquisition engine 302, data ingestion engine 310, data pre-processing engine 316, AI engine tuning engine 322, and inference engine 336.

The data acquisition engine 302 may identify various internal and/or external data sources to generate, test, and/or integrate new features for training the artificial intelligence engine 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In artificial intelligence, the quality of data and the useful information that can be derived therefrom directly affects the ability of the artificial intelligence engine 324 to learn. The data pre-processing engine 316 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 318 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 322 may be used to train an artificial intelligence engine 324 using the training data 318 to make predictions or decisions without explicitly being programmed to do so. The artificial intelligence engine 324 represents what was learned by the selected artificial intelligence algorithm 320 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 322 may repeatedly execute cycles of experimentation 326, testing 328, and tuning 330 to optimize the performance of the artificial intelligence algorithm 320 and refine the results in preparation for deployment of those results for consumption or decision making. To this end, the AI tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 318. A fully trained artificial intelligence engine 332 is one whose hyperparameters are tuned and engine accuracy maximized.

The trained artificial intelligence engine 332, similar to any other software application output, can be persisted to storage, file, memory, or application, or looped back into the processing component to be reprocessed. More often, the trained artificial intelligence engine 332 is deployed into an existing production environment to make practical business decisions based on live data 334. To this end, the artificial intelligence subsystem 300 uses the inference engine 336 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . C_n 338) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . C_n 338) live data 334 based on how similar they are to one another to solve exploratory challenges where little is known about the data, provide a description or label (e.g., C_1, C_2 . . . C_n 338) to live data 334, such as in classification, and/or the like. These categorized outputs, groups (clusters), or labels are then presented to the user input system 130. In still other cases, artificial intelligence engines that perform regression techniques may use live data 334 to predict or forecast continuous outcomes.

It will be understood that the embodiment of the artificial intelligence subsystem 300 illustrated in FIG. 3 is exemplary and that other embodiments may vary. As another example, in some embodiments, the artificial intelligence subsystem 300 may include more, fewer, or different components.

FIG. 4 illustrates a process flow 400 for vulnerability detection and mitigation using artificial intelligence in an electronic environment, in accordance with an embodiment of the disclosure. In some embodiments, a system (e.g., similar to one or more of the systems described herein with respect to FIGS. 1A-1C) may perform one or more of the steps of process flow 400. For example, a vulnerability detection and mitigation system (e.g., the system 130 described herein with respect to FIG. 1A-1C) may perform the steps of process flow 400. In some embodiments, an ML model (e.g., such as an ML model like that described in FIG. 2) and/or an AI engine (e.g., such as the AI engine like that described in FIG. 3) may perform some or all of the steps described in process flow 400.

As shown in block 402, the process flow 400 may include the step of receiving data from at least one data source. In some embodiments, the data comprises at least one of compliance data and/or regulatory data associated with at least one of network criteria, application criteria, infrastructure criteria, and/or policy criteria. In some embodiments, compliance data may be associated with internal rules for adhering to internal policies, rules issued by a regulatory authority, and/or the like. Additionally, and in some embodiments, the regulatory data may comprise rules issued by a regulatory authority, trade association, and/or the like. In some embodiments, the network criteria may refer to factors associated with at least one network, such as security (e.g., data security requirements), bandwidth requirements, performance, scalability, compatibility, encryption protocol, network topology, and/or the like. The application criteria may refer to factors associated with at least one application, such as access controls, security requirements, functional requirements, technical operation center criteria (e.g., department criteria or requirements), scalability, performance, version compatibility, and/or the like. The infrastructure criteria may comprise routers, switches, scalability, security, software-defined networking, and/or the like, in accordance with some embodiments of the disclosure provided herein. Policy criteria may refer to operational objectives, speed, service level agreements, compliance policies, and/or the like, in some embodiments.

In some embodiments, receiving the data from at least one data source may comprise a plurality of external data sources. In a non-limiting example, the data sources may comprise external websites comprising statutes and/or regulations applicable to at least one technical operation center. The external websites may comprise indices of the statutes and regulations. In some embodiments, the AI engine may comprise a multi-channel cognitive agent or bot, which may utilize at least one ML model to locate and access external data sources, which may include but are not limited to websites, governmental publications, and/or the like.

In some such embodiments, the multi-channel cognitive bot may determine which data sources apply to a given technical operations center and may direct the system to locate and access these data sources. In some embodiments, the multi-channel cognitive bot may use the ML model to determine which rules, statutes, regulations, and/or the like located within the data source are applicable to the given technical operations center. In an additional non-limiting example, the AI engine may determine that General Data Protection Regulation, Sarbanes-Oxley, Dodd-Frank, National Bank Act, regulations promulgated by the Office of the Comptroller of the Currency, Federal Trade Commission regulations, Securities and Exchange Commission regulations, and/or the like, may apply to a particular electronic environment hosted by an entity. The electronic environment may comprise a plurality of switches, applications, application interfaces, routers, networking ports, and/or the like, in accordance with some embodiments. After the AI engine determines which data sources apply, the ML model may process and evaluate the data from the data sources to determine what data to extract, based on some embodiments. In some embodiments of the disclosure provided herein, the ML model outputs may result in ML output data comprising data extraction rules. In such a configuration, the system may then extract the data, or a subset of the data, from the data sources and save the data to an internal data repository.

In some embodiments, the system may use an Extract, Transform, and Load (ETL) process to receive data from at least one data source, process the data, and then store in an internal data storage repository. In some embodiments, the at least one data source may comprise internally hosted data sources that may comprise regulatory and compliance data previously extracted from an external data source. In some embodiments, the at least one data source may comprise an internal data source comprising operational data associated with technical resources, efficiency, internal policy rules, and/or the like. In some embodiments, the at least one data source may comprise external regulatory and compliance rules and internal operational data.

As shown in block 404, the process flow 400 may include the step of generating at least one vulnerability attribute of a network device based on at least the data. In some embodiments, the vulnerability attribute may comprise criteria associated with compliance of policies or regulations. In some embodiments, a vulnerability attribute may refer to text within the data indicating factors required for compliance with the rules data. In such a configuration, the vulnerability attribute may comprise an indicator of compliance or non-compliance with the rules data. In some embodiments, a vulnerability attribute may be criteria associated with operational data and operational objectives of the technical operations center, electronic environment, and/or the like. In some embodiments, the vulnerability attribute may refer to technological criteria associated with hardware componentry within the electronic environment, such as switches, routers, and/or servers. In some embodiments, the vulnerability attribute may comprise a technology descriptor of hardware, software, application programming interfaces, and/or the like. In some embodiments, the vulnerability attribute may comprise a vulnerability threat threshold associated with a network device, a numerical value associated with non-compliance of vulnerability rules, and/or the like.

As shown in block 406, the process flow 400 may include the step of applying the vulnerability attribute to the AI engine. In some embodiments, applying the vulnerability attribute to the AI engine may comprise applying the vulnerability attribute to the AI engine, which may be pre-trained with a historical data, continuously trained with received data and historical datasets, and/or the like. In some embodiments, the AI engine may execute vulnerability detection scans based on the vulnerability attribute to determine if vulnerability threats exist in the electronic environment. In such a configuration, the AI engine may log a potential vulnerability for later review by the AI engine, a user, and/or the like.

As shown in block 408, the process flow 400 may include the step of assigning, by the AI engine, at least one weight to the vulnerability attribute of the network device. The weight may comprise a qualitative descriptor, quantitative value, and/or the like, in some embodiments. In some embodiments, the qualitative descriptor of the weight may comprise a letter grade (e.g., A to F), a written description (e.g., high, medium, low, and/or the like), and/or the like.

In some embodiments, the quantitative value of the weight may comprise a numerical rating (e.g., whole number, decimals, and/or the like) on a spectrum (e.g., from zero to one hundred), wherein smaller numerical ratings may be associated with lower vulnerability threats and higher numerical ratings may be associated with higher vulnerability threats. In some embodiments, the quantitative value of the weight may comprise a percentage, wherein a lower percentage is associated with a lower vulnerability threat and a higher percentage is associated with a higher vulnerability threat. In a non-limiting example, the AI engine may detect the network device within the electronic environment continuously, retrieve any vulnerability attribute associated with the network device, and assign a weight to any non-weighted vulnerability attributes. In some embodiments, the AI engine may continuously update the weight of vulnerability attributes associated with network devices based on updated rules data and operational data, a request by a user to update the weight, a system-generated request the weight, and/or the like. In some embodiments, the criticality may comprise the threat (e.g., system vulnerability, data security, compliance, network access controls, and/or the like) to the electronic environment if a particular vulnerability attribute resulted in a vulnerability threat.

In some embodiments, the weight may be associated with a criticality of the vulnerability attribute. In such a configuration, the criticality may be associated with an impact score to the technical operations center, the vulnerability threat of non-compliance with rules data, and/or the like. In some embodiments, the impact score may comprise a cumulative threat assessment rating based on all weighted vulnerability attributes. In some embodiments, the cumulative threat assessment rating may comprise an average, a mean, a mode, summation of weighted vulnerability attributes, a weighted average of weighted vulnerabilities attributes, and/or the like.

The AI engine may generate the impact score after assigning at least one weight to at least one vulnerability attribute of at least one network device within the electronic environment, in some embodiments. In some embodiments, the AI engine may generate the impact score and/or re-generate the impact score on a set interval schedule, via on-demand request, and/or continuously to evaluate potential threats and vulnerabilities in real time. In some embodiments, the impact score may comprise a quantitative value, qualitative descriptor, and/or the like. In some embodiments, the qualitative descriptor of the impact score may comprise a letter grade (e.g., A to F), a written description (e.g., high, medium, low, and/or the like), and/or the like. In some embodiments, the quantitative value of the weight may comprise a numerical rating (e.g., whole number, decimals, and/or the like) on a spectrum (e.g., from zero to one hundred), wherein smaller numerical ratings may be associated with a lower cumulative threat assessment rating and higher numerical ratings may be associated with a higher cumulative threat assessment rating. In some embodiments, the quantitative value of the impact score may comprise a percentage, wherein a lower percentage is associated with a lower cumulative threat assessment rating and a higher percentage is associated with a higher cumulative threat assessment rating.

A weighted vulnerability attribute provides insight into the scale of a potential vulnerability threat associated with the vulnerability attribute. In such configurations, and in some embodiments, this provides guidance into potential threat resolution actions within the electronic environment. In other embodiments, a plurality of weights may be assigned by the AI engine to the vulnerability attribute, or a plurality of vulnerability attributes, of the network devices. In some embodiments, a network device may only have a single vulnerability attribute, or a network device may have a plurality of vulnerability attributes. In a non-limiting example, when a network device has a plurality of vulnerability attributes, the vulnerability attributes may be associated with authentication requirements, permissions requirements (e.g., read-only access to data, edit access to data, and/or the like), version requirements for a software stack (e.g., firmware, middleware, application, database, virtual machine, server, virtual server, operating system, application programming interfaces, and/or the like), and/or the like. In such a configuration, and in some embodiments, the AI engine may assign a weight to each of the plurality of the vulnerability attributes.

In some embodiments, the AI engine may assign multiple weights to a single vulnerability. In a non-limiting example, a network device may comprise a vulnerability attribute associated with authentication credentials. In such a configuration, and in some embodiments, the AI engine may assign a different weight to each authentication method associated with the authentication credentials, including without limitation single-factor authentication, multi-factor authentication, biometric authentication, and/or the like. The weights may differ based on the security of each authentication method, in some embodiments. A non-limiting example may include a different weight assigned to a physical characteristic authentication compared to a weight assigned to a user-generated password, in some embodiments.

In some embodiments, the plurality of weights may correspond to differing threat criteria derived from the data, with each criteria assigned a specific weight. In a non-limiting example, different threat criteria may comprise different known security threats, such as malware, ransomware, Denial of Service (DoS) and/or Distributed Denial of Service (DDoS) attacks, deception threats, computer viruses, and/or the like. In such a configuration, and in some embodiments, the AI engine may assign a different weight to each threat criteria based on factors associated with the known security threat, wherein the factors may comprise known remediation plans, known prevalence of the threat criteria external to the electronic network, dark web activity associated with the known threat, and/or the like. In some embodiments, when a plurality of network devices is within the electronic environment, the AI engine may assign at least one weight to each network device. The AI engine may execute scans each time a new network device is added to the electronic environment, continuously scan the electronic environment, execute scans on set internals, and/or execute on-demand scans to detect network devices lacking assigned weights, and thereafter may assign a weight, in some embodiments. In some embodiments, the AI engine continuously reassesses and reassigns the assigned weights based on received data.

As shown in block 410, the process flow 400 may include the step of generating, by the AI engine, a vulnerability matrix of the network device based on the at least one weight. In some embodiments, the vulnerability matrix may comprise groupings of weighted vulnerabilities associated with a network device, wherein the groupings include subgroups of related vulnerabilities. In such a configuration, the vulnerability matrix may indicate ranked priorities for remediating threats identified by the vulnerability matrix. In some embodiments, the vulnerability matrix may comprise a network topology map of weighted vulnerabilities across all network devices within an electronic environment. In some embodiments, the network topology map may comprise a network diagram indicating all network devices of at least one network of the electronic environment, including without limitation user devices, servers, routers switches, and/or the like. The network topology map may depict the network devices as nodes and may depict the connections between the nodes, according to some embodiments. In some embodiments, the network topology map may depict the weighted vulnerabilities associated with each network device on each node associated with each network device. In such a configuration, the vulnerability matrix may indicate which network devices pose the greatest vulnerability threats based on the weighting assigned to each network device.

In some embodiments, the AI engine may execute updates to the vulnerability matrix continuously, providing real-time updates to the vulnerability matrix. Thus, and in some embodiments, the vulnerability matrix is constantly updating based on received data, rules applicable to the network devices, determined vulnerability attributes, and corresponding weighting. In such configurations, the vulnerability matrix is modified as new rules are promulgated by regulatory authorities and/or threats within the electronic environment evolve. In some embodiments, the vulnerability matrix may comprise a color-coded heat map depicting vulnerability threats requiring remediation, which may be viewable via an interface. In some embodiments, the color-coded heat map may comprise a network diagram and/or network topology map with a node representing each network device, system component, and/or the like. The color-coding of the heat map may visually depict severity of each vulnerability threat associated with each network device, such as red as most severe threats, yellow as intermediately severe threats, and/or green as low and/or no severe threats, according to some embodiments. In some embodiments the interface may organize threats by severity level and/or allow a user to filter threats by severity level, such as by an associated color (e.g., red, yellow, green, and/or the like).

FIG. 5 illustrates a process flow 500 for generating a vulnerability forecasting map, in accordance with an embodiment of the disclosure. In some embodiments, a system (e.g., similar to one or more of the systems described herein with respect to FIGS. 1A-1C) may perform one or more of the steps of process flow 500. For example, a vulnerability detection and mitigation system (e.g., the system 130 described herein with respect to FIG. 1A-1C) may perform the steps of process flow 500. In some embodiments, an ML model (e.g., such as a an ML model like that described in FIG. 2) and/or an AI engine (e.g., such as the AI engine like that described in FIG. 3) may perform some or all of the steps described in process flow 500.

As shown in block 502, the process flow 500 may include the step of generating a forecast engine, wherein the forecast engine comprises a forecast ML model. In some embodiments, the forecast engine may determine future rules data that may be generated by a rule authority based on historical data, historical public rules, historical internal rules, and/or real-time data. The forecast ML model may be pre-trained with historical data, trained continuously using real-time data, and/or the like. In some embodiments, the forecast engine may predict future vulnerabilities based on historical data and real-time data, wherein the real-time data comprises vulnerability data and known threats.

As shown in block 504, the process flow 500 may include the step of updating the forecast engine with the data and the vulnerability matrix. In some embodiments, the forecast engine may update based on the data received by the system and the vulnerability matrix. In some embodiments, the updates to the forecast engine may occur in real time, as data is continuously received, and the vulnerability matrix updates in real-time. In some embodiments, the updates to the forecast engine occur via batch processing at set intervals. After updating the forecast engine, the forecast ML model may undergo a retraining process to modify the forecast ML model based on at least the updates to the forecast engine. In accordance with some embodiments, the forecast ML model may be modified based on new threats associated with new rules data, known emerging threats, and/or the like.

In other embodiments, the forecast ML model may be replaced by a supplemental forecast ML model if the system, a user, and/or the like determines a deficiency with the forecast ML model and/or that the supplemental forecast ML model comprises superior performance, improved efficiency, reduced errors, and/or the like. In some embodiments, a manager or operator may supply the supplemental forecast ML model. In such a configuration, the supplemental forecast ML model would replace the forecast ML model. In some embodiments, the forecast engine may receive feedback data via feedback loop to analyze output of the forecast ML model. In some embodiments, the feedback data may comprise forecast ML model performance statistics, an accuracy score associated with the forecast ML model, performance reviews provided by the manager or operator, forecast ML model output errors logs, and/or the like. The forecast engine may generate the supplemental ML model based on at least the feedback data, rules data, and/or operational data, in some embodiments. In such a configuration, the supplemental forecast ML model would replace the forecast ML model.

As shown in block 506, the process flow 500 may include the step of generating, using the forecast engine, a vulnerability forecasting map. In some embodiments, the vulnerability forecasting map comprises groupings of potential vulnerabilities. In some embodiments, the groupings may comprise related rules data associated with a set of network devices, a set of related rules associated with a technical operations center, a set of rules associated with emerging known threats, and/or the like. In some embodiments, related rules data may comprise rules data that only apply to certain network devices within the electronic environment (e.g., switches, routers, applications and/or the like) and may not apply to other types of network devices. In a non-limiting example, related rules data may only apply to switches but may not apply to routers, and a grouping associated with related rules data applying to switches may be created. In some embodiments, related rules data may form a grouping comprising all rules data that only applies to a certain technical operations center. In some embodiments, related rules data may form a grouping comprising emerging known threats associated with network security, network access controls, data security requirements, and/or the like. In other embodiments, the vulnerability forecasting map indicates new rules data that may be generated by an external regulatory authority, an internal rule authority, and/or the like. In such a configuration, the vulnerability forecasting map indicates what changes may be needed to the forecast ML model, the AI engine, the vulnerability attributes, threat remediation plans, the electronic environment, network devices, and/or the like.

FIG. 6 illustrates a process flow 600 for determining, using the AI engine, remediation recommendations based on the rule threat map, in accordance with an embodiment of the disclosure. In some embodiments, a system (e.g., similar to one or more of the systems described herein with respect to FIGS. 1A-1C) may perform one or more of the steps of process flow 600. For example, a vulnerability detection and mitigation system (e.g., the system 130 described herein with respect to FIG. 1A-1C) may perform the steps of process flow 600. In some embodiments, an ML model (e.g., such as an ML model like that described in FIG. 2) and/or an AI engine (e.g., such as the AI engine like that described in FIG. 3) may perform some or all of the steps described in process flow 600.

As shown in block 602, the process flow 600 may include the step of identifying, using an NLP model, regulatory parameters associated with the data. In some embodiments, the data may comprise non-relevant data and relevant rules data. In some embodiments, the non-relevant data may comprise rules data associated with an unrelated technical operations center, unaffiliated electronic environment, at least one network device outside the electronic environment, and/or the like. In some embodiments, the non-relevant data may have no impact to vulnerability threat detection and remediation of the electronic environment. Processing the entirety of the data may consume resources, negatively impact efficiency, and/or the like if non-relevant data were fully processed by the system. To resolve this technical challenge, and in some embodiments, the system may use the NLP model to identify relevant rules data within the data. The NLP model may parse through data from at least one data source to extract the relevant rules data, in some embodiments. The at least one data source may comprise regulatory codes, regulatory authority sites, governmental publications, trade association databases, public/private hybrid databases, and/or the like. Relevant rules data may comprise rules that apply to a given electronic environment, at least one network device, and/or the like, in accordance with some embodiments of the disclosure provided herein. In a non-limiting example, the NLP model may parse through the data to identify the relevant rules data within the data associated with the electronic environment, at least one network device, the technical operations center, and/or the like. When the NLP model identifies the relevant rules data, it may extract the relevant rules data, in some embodiments. In some embodiments, the system may save the relevant rules data to a database, transmit the relevant rules data via network data packets, and/or the like.

As shown in block 604, the process flow 600 may include the step of extracting operational data from at least one internal database. In some embodiments, the relevant rules data may be inadequate for determining vulnerabilities within the electronic environment. In such configurations, and in some embodiments, the system may extract operational data from at least one internal database. The operational data may comprise internal policy rules, which may further comprise previously extracted rules data. In some embodiments, the internal policy rules may comprise operational objectives associated with service level agreements, electronic environment service uptime targets (e.g., percentage of time wherein the electronic environment is fully functional, free of service disruptions, and/or the like), performance efficiency indicators, resource efficiency, representative efficiency indicators, and regulatory compliance indicators. In some embodiments, the NLP model may parse through internal data repositories, data lakes, databases, and/or the like, to identify and extract operational data relevant to a particular technical operations center, electronic environment, and/or the like.

As shown in block 606, the process flow 600 may include the step of generating, using an ML model, a rule threat map based on the regulatory parameters and the operational data. In some embodiments, the ML model may be pre-trained with historical data, trained continuously using real-time data, and/or the like. In addition, the ML model may be retrained with at least one updated dataset, in accordance with some embodiments, such that the system comprises a feedback loop comprising its updated dataset(s). In some embodiments, the ML model maps the rules data to the operational data to generate a rule threat map. The rule threat map may indicate the relationships between the rule data and operational data, such as including but not limited to showing the relationships between nodes indicating each rule and each operational requirement, with vectors indicating the relationships between each node, according to some embodiments. In some embodiments, the rule threat map may indicate vulnerabilities within the electronic environment. The vulnerabilities may comprise vulnerabilities associated with at least one network device, access control requirements, out of date and/or unpatched code, malicious code propagated by a bad actor, personally identifiable information, and/or the like. In some embodiments, the rule threat map may indicate vulnerabilities in the internal policy rules based on the rules data, wherein the vulnerabilities comprise necessary updates to the internal policy rules to comply with the rules data. Updates to the internal policy rules may determine preventative and responsive corrective actions to address vulnerabilities, such as modifying software, providing updates to at least one network devices, restricting access controls, and/or the like. The rule threat map may be updated in real time based on continuously received rules data and operational data, according to some embodiments. In such a configuration, changes in rules data and operational data may modify the rule threat map as rules data change and operational data evolve. In some embodiments, the ML model may generate recommendations for executing technical operational objectives associated with internal policy rules while also preventing the creation of additional rule anomalies based on the rules data.

As shown in block 608, the process flow 600 may include the step of determining, using the AI engine, remediation recommendations based on the rule threat map. In some embodiments, the AI engine may identify remediation plans and recommendations to resolve rule anomalies identified by the rule threat map. In such a configuration, the system may generate a notification associated with the remediation recommendations and transmit a notification to user devices associated with managers or operators of the network devices associated with the rule threat map comprising the rule anomaly(ies). The remediation recommendations may comprise compliance plans, generating new operational data to replace a subset of internal policy rules, updates to software, resolving code issues, applying software patches, shutting down a network, isolating and segmenting a device from the network, adjusting technical operations in response to the rule threat map, and/or the like.

In some embodiments, the AI engine may generate new code and revised internal policy rules for eliminating vulnerabilities identified in the rule threat map. In such a configuration, the AI engine may generate the new code in a test environment and may generate test cases to autonomously test and redevelop code as necessary. Once the AI engine determines the code and revised internal policy rules resolve the vulnerabilities identified in the rule threat map, the AI may generate a notification to the user device(s) associated with the managers or operators for code review and internal policy rule review, additional testing, and implementation, according to some embodiments.

FIG. 7 illustrates a process flow 700 for generating, using the AI engine, a vulnerability matrix remediation based on the prioritized hierarchy of rule anomalies, in accordance with an embodiment of the disclosure. In some embodiments, a system (e.g., similar to one or more of the systems described herein with respect to FIGS. 1A-1C) may perform one or more of the steps of process flow 700. For example, a vulnerability detection and mitigation system (e.g., the system 130 described herein with respect to FIG. 1A-1C) may perform the steps of process flow 700. In some embodiments, an ML model (e.g., such as an ML model like that described in FIG. 2) and/or an AI engine (e.g., such as the AI engine like that described in FIG. 3) may perform some or all of the steps described in process flow 700.

As shown in block 702, the process flow 700 may include the step of receiving network data packets, wherein the network data packets comprise aggregated vulnerability data. In some embodiments, the network data packets are transmitted via a private network channel, wherein the private network channel comprises a secure socket layer, encrypted communications, and/or the like. The network data packets may undergo pre-transmission processing, wherein the pre-transmission processing may comprise encryption, ETL, data cleansing, and/or the like. The aggregated vulnerability data may comprise a collection of data across the electronic environment containing vulnerabilities, according to some embodiments. In such a configuration, the vulnerabilities may comprise vulnerabilities associated with the rules data and/or vulnerabilities associated with the operational data. In some embodiments, the aggregated vulnerability data may be associated with at least one network device. In some embodiments, a data aggregator may collect vulnerability data to generate aggregated vulnerability data and transmit the aggregated vulnerability data via network data packets to the system. In some embodiments, the system may process the received network data packets, such as executing decryption, data extraction, and/or the like.

As shown in block 704, the process flow 700 may include the step of determining, using the AI engine, rule anomalies based on at least the aggregated vulnerability data. In some embodiments, rule anomalies may comprise deviations from at least one of the rules data and the operational data, indicating anomalous data. In some embodiments, rules data and/or operational data may comprise parameters establishing a deviation. Anomalous data may comprise log data, error reports, compliance status analytics, network monitoring output data, and/or the like indicating the existence of a deviation associated with a rule anomaly. By way of non-limiting example, rules data may comprise data security requirements, network access controls, authentication requirements, permissions restrictions, software version requirements (e.g., n−1 version of latest release, n version of latest release, and/or the like), software security patches, and/or the like. Based on such rules data, and in some embodiments, there may be parameters for implementing network access controls for accessing a network device. In some embodiments, failing to implement the network access controls may comprise a deviation from rules data, which may yield a rule anomaly.

Rule anomalies, and associated anomalous data, may comprise a threat to the electronic environment, such as a threat associated with security, regulatory compliance, computing resource efficiency, technical efficiency, resources, error minimization, and/or the like, according to some embodiments. In some embodiments, the AI engine may execute a rule anomaly deviation scan to detect any deviation associated with the rules data (e.g., a rule anomaly) present in the electronic environment. Once a rule anomaly is detected, the AI engine may generate and transmit an alert to a manger, controller, user, and/or the like, capturing the rule anomaly, describing the deviation, and/or the like.

Deviations from rules data may comprise a threat to the electronic environment due to lacking data security requirements, access controls, and/or the like, thus reducing the overall security of the electronic environment and creating opportunities for malicious actors to attack the electronic environment, in some embodiments of the disclosure.

As shown in block 706, the process flow 700 may include creating, using the AI engine, a prioritized hierarchy of the rule anomalies based on the vulnerability matrix, wherein the vulnerability matrix comprises vulnerability criteria and a vulnerability threshold. The vulnerability matrix, in some embodiments, may comprise vulnerability criteria and a vulnerability threshold. In some embodiments, vulnerability criteria may comprise configurations, connectivity requirements, access controls, network port accessibility, authentication scans, penetration testing results, and/or the like. In some embodiments, the vulnerability threshold may be an indicator associated with deviations from rule data, resulting in a rule anomaly.

In some embodiments, the AI engine may prioritize the rule anomalies based on at least the vulnerability matrix. The vulnerability matrix may determine how to prioritize the rule anomalies, according to some embodiments. In addition, and/or alternatively, operational data, which may include internal rule policies, and/or input by stakeholders and/or users may determine a reprioritization of the rule anomalies following an original prioritization by the AI engine.

In some embodiments, the prioritized hierarchy of rule anomalies may represent the biggest threats to the electronic environment, with the highest-priority rule anomalies denoted by indicators communicating requisite immediate remediation actions. In some embodiments, indicators may be associated with a timeframe for requisite remediation, such as completion of remediation must occur prior to a certain time period established by rules data and/or operational data. In some embodiments, the prioritized hierarchy may be determined by the scope of remediation actions to remedy the rule anomalies, wherein the scope may be associated with technical resources, technical complexity, projected timeframe, resource cost, and/or the like. The AI engine may be retriggered to recreate and/or modify the prioritized hierarchy of rule anomalies based on a threat level, scope of remediation, and/or the like, in some embodiments. When the AI engine may be retriggered, the AI engine may utilize a modified vulnerability matrix to generate a new prioritized hierarchy of rule anomalies.

As shown in block 708, the process flow 700 may include the step of generating, using the AI engine, a vulnerability matrix remediation based on the prioritized hierarchy of rule anomalies. In some embodiments, the system may generate a vulnerability matrix remediation for remediating rule anomalies. In such a configuration, the AI engine may utilize the prioritized hierarchy of rule anomies to create the vulnerability matrix remediation. In some embodiments, the vulnerability matrix remediation may comprise color-coded indicators and descriptive indicators depicting the vulnerability threat level associated with a rule anomaly. In such a configuration, the vulnerability matrix remediation may be presented on a display of a user device to view the color-coded indicators and descriptive indicators. In some embodiments, the vulnerability matrix remediation may comprise groupings based on the prioritized hierarchy of rule anomalies. The groupings may be associated with a threat level identified by the AI engine, wherein the threat levels may comprise immediate remediation response action, intermediate remediation response action, low remediation response action, and/or no remediation response action. In a non-limiting example, a threat level for a network device that supports a global application accessed by millions of end users may be in a grouping associated with immediate remediation response actions. In some embodiments, the vulnerability matrix remediation may comprise remediation response recommendations, which may comprise responsive corrective actions and/or preventative actions to avert future rule anomalies.

FIG. 8 illustrates a process flow 800 for training and retraining the AI engine based on at least one historical dataset and the aggregated vulnerability data, in accordance with an embodiment of the disclosure. In some embodiments, a system (e.g., similar to one or more of the systems described herein with respect to FIGS. 1A-1C) may perform one or more of the steps of process flow 800. For example, a vulnerability detection and mitigation system (e.g., the system 130 described herein with respect to FIG. 1A-1C) may perform the steps of process flow 800. In some embodiments, an ML model (e.g., such as an ML model like that described in FIG. 2) and/or an AI engine (e.g., such as the AI engine like that described in FIG. 3) may perform some or all of the steps described in process flow 800.

As shown in block 802, the process flow 800 may include the step of receiving at least one historical dataset. The historical dataset may be stored in an internal data repository, hosted externally by a regulatory authority, and/or the like. In some embodiments, the system may collect, compile, and/or aggregate historical data to create the historical dataset and may store the historical dataset in an internal data repository. In such a configuration, the system may access and retrieve the historical dataset each time the AI engine may be trained. In some embodiments, the system may receive the historical dataset at set internals and/or via on-demand request generated by the AI engine, a user, an AI engine training controller, and/or the like. In some embodiments, the system may only receive a subset of data contained within the historical dataset based on training requirements associated with an AI engine training request generated by the system, user, and/or the like. In a non-limiting example, the system may generate a request to train the AI engine on rules data associated with network devices using a certain operating system, and may only receive a subset of the historical dataset comprising the rules data associated with network devices using a certain operating system.

As shown in block 804, the process flow 800 may include the step of training the AI engine based on at least one historical dataset, wherein the at least one historical dataset comprises at least one of historical regulatory parameters associated with historical compliance data, historical vulnerability attributes associated with the network device, historical operational objectives associated with historical operational data, historical weights associated with historical vulnerability attributes, and/or historical vulnerability matrices. In some embodiments, historical regulatory parameters associated with historical compliance data may comprise criteria promulgated by a regulatory authority associated with compliance performance statistics of the electronic environment, technical operations center, and/or the like. In some embodiments, historical operational objectives associated with historical operational data may comprise technical criteria associated with technical performance statistics of the electronic environment, technical operations center, and/or the like. In some embodiments, training the AI engine may be triggered by a request generated by a user, the system, set via predefined periodic intervals, and/or occur continuously via feedback loop as data is received by the system.

As shown in block 806, the process flow 800 may include the step of receiving the aggregated vulnerability data. In some embodiments, receiving the aggregated vulnerability data may comprise receiving network data packets comprising the aggregated vulnerability data. In some embodiments, a data aggregator may collect vulnerability data to generate aggregated vulnerability data and transmit the aggregated vulnerability data via network data packets to the system. In some embodiments, the data aggregator may pre-process the data, such as data cleansing, encrypting, and/or executing an ETL process. In some embodiments, the system may process the received network data packets, such as executing decryption, data extraction, and/or the like.

As shown in block 808, the process flow 800 may include the step of updating the at least one historical dataset with the aggregated vulnerability data. In some embodiments, the aggregated vulnerability data may be attached to the at least one historical dataset. In such a configuration, an ETL process may be executed to transmit the aggregated vulnerability dataset to the same data storage repository as the at least one historical dataset.

As show in block 810, the process flow 800 may include the step of retraining the AI engine based on the aggregated vulnerability data. The retraining step may be executed via feedback loop for continuous retraining and/or the retraining may occur via batch jobs, according to some embodiments. In some embodiments, the AI engine may refine itself by revising its weights and other such decision factors to improve accuracy, speed, and minimize errors, based on an AI engine training confidence threshold. In some embodiments, if the AI engine training confidence threshold is below a given confidence threshold, the system may trigger retraining of the AI engine. In some embodiments, if new rules data are generated, then the system may trigger in real-time retraining of the AI engine based on the new rules data. By constantly monitoring for new rules data and triggering a responsive real-time retraining, the system provides a technical solution to the challenge of monitoring rules changes and adjusting the system dynamically.

FIG. 9 illustrates a process flow 900 for updating the vulnerability matrix with the confidence threshold associated with the vulnerability matrix remediation, in accordance with an embodiment of the disclosure. In some embodiments, a system (e.g., similar to one or more of the systems described herein with respect to FIGS. 1A-1C) may perform one or more of the steps of process flow 900. For example, a vulnerability detection and mitigation system (e.g., the system 130 described herein with respect to FIG. 1A-1C) may perform the steps of process flow 900. In some embodiments, an ML model (e.g., such as an ML model like that described in FIG. 2) and/or an AI engine (e.g., such as the AI engine like that described in FIG. 3) may perform some or all of the steps described in process flow 900.

As shown in block 902, the process flow 900 may include the step of executing the vulnerability matrix remediation. In some embodiments, the vulnerability matrix remediation may specify a text indicator associated with the rule anomaly indicating the non-compliance, indicate the impacted at least one network device, identify at least one application associated with the at least one network device, determine end users associated with the at least one application, and/or a resource cost associated with the rule anomaly. In some embodiments, executing vulnerability matrix remediation may comprise executing at least one sequence of the vulnerability matrix remediation, wherein a sequence of the vulnerability matrix remediation may comprise at least one remediation responsive action of the vulnerability matrix remediation based on the vulnerability threat level. In a non-limiting example, executing the remediation responsive action may comprise patching software, updating a version of code on a network device and/or application, removing access of at least one user account, heightening network access control requirements, requiring additional security access controls, and/or the like. In some embodiments, executing the vulnerability matrix remediation may comprise executing all sequences of the vulnerability matrix remediation based on the vulnerability threat level, which may comprise executing all remediation responsive actions of the vulnerability matrix remediation. In some embodiments, executing vulnerability matrix remediation may comprise executing a subset of sequences (e.g., remediation responsive actions) of the vulnerability matrix remediation based on the vulnerability threat level.

As shown in block 904, the process flow 900 may include the step of determining, using the AI engine, a confidence threshold associated with the vulnerability matrix remediation. In some embodiments, executing the vulnerability matrix remediation may yield a complete remediation of the rule anomaly. However, in some embodiments, executing the vulnerability matrix remediation results in a partial or complete non-remediation of the rule anomaly (e.g., failure to mitigate the rule anomaly). In such a configuration, the rule anomaly has not been remediated, and further remediation response action may be necessary to comply with the rules data and/or operational data. In some embodiments, a confidence threshold associated with the vulnerability matrix remediation may indicate the success or failure of the vulnerability matrix remediation to fully, or partially, resolve a rule anomaly.

As shown in block 906, the process flow 900 may include the step of comparing the confidence threshold to the vulnerability threshold to determine a rule anomaly remediation score. In some embodiments, the system may compare the confidence threshold to the vulnerability threshold to determine a confidence level associated with the attempted remediation measure. In such a configuration, the rule anomaly remediation score may indicate whether the vulnerability matrix remediation resolved or mitigated the rule anomaly. If the rule anomaly remediation score indicates that the rule anomaly was not resolved partially or fully, the rule anomaly may require further corrective action to fully mitigate.

As shown in block 908, the process flow 900 may include the step of updating the vulnerability matrix with the confidence threshold associated with the vulnerability matrix remediation. In some embodiments, the rule anomaly score may indicate full mitigation of the rule anomaly. Thus, and in some embodiments, updating the vulnerability matrix with the confidence threshold associated with the vulnerability matrix remediation may comprise removal of the rule anomaly from the vulnerability matrix and/or indicating full mitigation of the rule anomaly. In some embodiments, the rule anomaly score may indicate a lack of full mitigation (whether partial or full resolve) of the rule anomaly. In such scenarios, updating the vulnerability matrix with the confidence threshold associated with the vulnerability matrix remediation may comprise an indicator that additional corrective responsive actions are required for full mitigation.

FIG. 10 illustrates a process flow 1000 for generating, using the AI engine, a composite vulnerability weight based on the rule vulnerability weight and the operational weight, in accordance with an embodiment of the disclosure. In some embodiments, a system (e.g., similar to one or more of the systems described herein with respect to FIGS. 1A-1C) may perform one or more of the steps of process flow 1000. For example, a vulnerability detection and mitigation system (e.g., the system 130 described herein with respect to FIG. 1A-1C) may perform the steps of process flow 1000. In some embodiments, an ML model (e.g., such as an ML model like that described in FIG. 2) and/or an AI engine (e.g., such as the AI engine like that described in FIG. 3) may perform some or all of the steps described in process flow 1000.

As shown in block 1002, the process flow 1000 may include the step of identifying, using the AI engine, a rule vulnerability attribute based on the data. In some embodiments, the rule vulnerability attribute based on the data may comprise criteria associated with complying with rules data, policies, and/or regulations. In some embodiments, the rule vulnerability attribute may refer to text within the data indicating factors required for compliance with rules data. In such a configuration, the rule vulnerability attribute may comprise an indicator of compliance or non-compliance with the rules data.

As shown in block 1004, the process flow 1000 may include the step of identifying, using the AI engine, an operational vulnerability attribute. In some embodiments, an operational vulnerability attribute may be criteria associated with operational data and operational objectives of the technical operations center, electronic environment, and/or the like. In some embodiments, the operational vulnerability attribute may refer to technological criteria associated with hardware componentry within the electronic environment, such as routers, switches, servers, and/or the like. In some embodiments, the operational vulnerability attribute may comprise a technology descriptor of hardware, software, application programming interfaces, and/or the like. In some embodiments, the operational vulnerability attribute may comprise an operational threat threshold associated with at least one network device, a numerical value associated with non-compliance of operational rules, and/or the like.

As shown in block 1006, the process flow 1000 may include the step of assigning, using the AI engine, a rule vulnerability weight for the rule vulnerability attribute and an operational weight for the operational vulnerability attribute. In some embodiments, the AI engine may assign a rule vulnerability weight for the rule vulnerability attribute, wherein the rule vulnerability weight may comprise a rule criticality of the rule vulnerability attribute. In such a configuration, the rule criticality may be associated with a rule compliance score for the technical operations center and/or electronic environment, the threat of non-compliance with rules data, and/or the like. The system may use the threat compliance score to indicate a cumulative threshold associated with all vulnerability threats associated with each network device, in some embodiments. In some embodiments, a rule compliance score may comprise a qualitative descriptor, quantitative value, and/or the like. In some embodiments, the qualitative descriptor of the threat compliance score may comprise a letter grade (e.g., A to F), a written description (e.g., high, medium, low, and/or the like), and/or the like. In some embodiments, the quantitative value of the threat compliance score may comprise a numerical rating (e.g., whole number, decimals, and/or the like) on a spectrum (e.g., from zero to one hundred), wherein smaller numerical ratings may be associated with lower threat compliance threats and higher numerical ratings may be associated with higher threat compliance threats. In some embodiments, the quantitative value of the threat compliance score may comprise a percentage, wherein a lower percentage is associated with a lower threat compliance threat and a higher percentage is associated with a higher threat compliance threat.

A weighted rule vulnerability attribute provides insight into the scale of a potential vulnerability threat associated with the rule vulnerability attribute. In such configurations, and in some embodiments, the weighted rule vulnerability attribute provides guidance into potential threat resolution actions within the electronic environment. In some embodiments, the system, user, and/or the like evaluating the weighted vulnerability attribute may determine how to prioritize threat resolution actions based on technical complexity, known threats, scale of deficiencies associated with the weighted rule vulnerability attribute, and/or the like. A non-limiting example may comprise the weighted rule vulnerability attribute indicating that a subset of network devices may have a large, weighted rule vulnerability attribute associated with a severe vulnerability threat whereas the remaining network devices may have a small, weighted rule vulnerability attribute associated with a low vulnerability threat. In such a configuration, and in some embodiments, threat resolution actions to remediate the severe vulnerability threat may be prioritized over the small vulnerability threat.

In some embodiments, the AI engine may assign an operational weight for the operational vulnerability attribute, wherein the operational weight may comprise an operational criticality associated with the operational vulnerability attribute. In such a configuration, the operational criticality may be associated with an operational score for the technical operations center and/or electronic environment, the threat of non-compliance with operational data (including internal policy rules), and/or the like. A weighted operational vulnerability attribute provides insight into the scale of a potential vulnerability threat associated with the operational vulnerability attribute. In such configurations, and in some embodiments, this provides guidance into potential threat resolution actions within the electronic environment.

In some embodiments, the system, user, and/or the like evaluating the weighted operational attribute may determine the scale and/or remediation actions associated with the weighted operational attribute based on technical complexity, known threats, scale of deficiencies associated with the weighted operational attribute, and/or the like. A non-limiting example may comprise the weighted operational vulnerability attribute indicating that a subset of network devices may have a large weighted operational vulnerability attribute associated with a severe operational vulnerability threat whereas the remaining network devices may have a small weighted operational vulnerability attribute associated with a low vulnerability threat. In such a configuration, and in some embodiments, threat resolution actions to remediate the severe vulnerability threat may be prioritized over the small vulnerability threat. In some embodiments, the remediation actions may be determined based on technical complexity, projected timeframe for implementing remediations actions, and/or the like.

As shown in block 1008, the process flow 1000 may include the step of generating, using the AI engine, a composite vulnerability weight based on the rule vulnerability weight and the operational weight. In some embodiments, the AI engine may create a composite vulnerability weight utilizing the rule vulnerability weight and the operational weight. In such configurations, the system may generate a unified vulnerability threat assessment for each network device in the electronic environment. In some embodiments, the threats to the electronic environment comprise both rule vulnerabilities and operational vulnerabilities, and therefore, it may be necessary to utilize a composite weighting system to assess threats and vulnerabilities when creating a remediation plan and/or vulnerability matrix remediation. In some embodiments, the composite weighting system may comprise an average of the rule vulnerability weight and the operational vulnerability weight, a mean of the rule vulnerability weight and the operational vulnerability weight, a mode of the rule vulnerability weight and the operational vulnerability weight, summation of the rule vulnerability weight and the operational vulnerability weight, a weighted average of the rule vulnerability weight and the operational vulnerability weight, and/or the like. In some embodiments, the prioritized hierarchy of rule anomalies may be based on at least the composite vulnerability weight. In such configurations, the vulnerability matrix remediation then may be based on the prioritized hierarchy of rule anomalies that is based on the composite vulnerability weight of each network device.

FIG. 11 illustrates a process flow 1100 for generating at a user interface and generating least one alert based on the vulnerability matrix, in accordance with an embodiment of the disclosure. In some embodiments, a system (e.g., similar to one or more of the systems described herein with respect to FIGS. 1A-1C) may perform one or more of the steps of process flow 1100. For example, a vulnerability detection and mitigation system (e.g., the system 130 described herein with respect to FIG. 1A-1C) may perform the steps of process flow 1100. In some embodiments, an ML model (e.g., such as an ML model like that described in FIG. 2) and/or an AI engine (e.g., such as the AI engine like that described in FIG. 3) may perform some or all of the steps described in process flow 1100.

As shown in block 1102, the process flow 1100 may include the step of generating a user interface on a display, wherein the user interface comprises at least one interactive dashboard. In some embodiments, the system may generate and display at least one interactive dashboard for making modifications to the system, viewing analytics, and/or analyzing notifications. In some embodiments, a user may need to authenticate to gain access to the user interface. Authentication may comprise single factor authentication or multifactor authentication, wherein multifactor authentication requires at least two of a one-time password, unique security token generation and authentication, user credentials, biometric authentication, a mobile authenticator application, codes received via messaging service, and/or the like. Once authenticated, a user may navigate the interactive dashboards to view compliance analytics, operational analytics, rules data, operational data, rule anomalies, the vulnerability matrix, the vulnerability matrix remediation, the rule threat map, as well as configurations for the NLP model, ML model, forecast ML model, the forecast engine, and/or the AI engine.

As shown in block 1104, the process flow 1100 may include the step of generating at least one alert based on the vulnerability matrix. In some embodiments, the vulnerability matrix may comprise a rule anomaly that requires notification and some responsive action. In such scenarios, the system may generate at least one alert based on at least one of the vulnerability matrix, the vulnerability matrix remediation, and/or the rule threat map. The alert may comprise a written description of the rule anomaly, the vulnerability matrix, the impacted hardware and software, and/or potential remediation recommendations, according to some embodiments.

In some embodiments, the user interface may provide for modifications to the system. In a non-limiting example, the user may modify any of the configurations, training settings, and/or execution settings of the NLP model, ML model, forecast machine learning model, the forecast engine, and/or the AI engine via the user interface by inputting associated controls signals. Once the control signals are received, the system may update the corresponding models, engines, and/or the like. In a non-limiting example, a user may trigger retraining of all models and/or engines based on inputted control signals. In an additional non-limiting example, a user may modify at least one of the NLP model, ML model, forecast ML model, the forecast engine, and/or the AI engine via the interface, and thereafter retrigger the vulnerability detection and mitigation associated processes executed by any of the process flows 400-1000 described herein.

In some embodiments, the system may generate automated reports and dashboards that correspond to rule vulnerability and operational vulnerability performance. In such configurations, the system may generate reports and dashboards based on at least the vulnerability matrix and vulnerability matrix remediation. Each time the system updates, the corresponding reports and dashboards update to provide transparency and insight into real-time compliance and operational execution.

FIG. 12 illustrates a process flow 1200 for modifying the vulnerability matrix, in accordance with an embodiment of the disclosure. In some embodiments, a system (e.g., similar to one or more of the systems described herein with respect to FIGS. 1A-1C) may perform one or more of the steps of process flow 1200. For example, a vulnerability detection and mitigation system (e.g., the system 130 described herein with respect to FIG. 1A-1C) may perform the steps of process flow 1200. In some embodiments, an ML model (e.g., such as an ML model like that described in FIG. 2) and/or an AI engine (e.g., such as the AI engine like that described in FIG. 3) may perform some or all of the steps described in process flow 1200.

As shown in block 1202, the process flow 1200 may include the step of receiving control signals from a user device, wherein the control signals comprise a revised mode of the AI engine, a second vulnerability attribute, and a second weight. In some embodiments, the system may provide for scenario analysis functionality so a user may analyze threat assessments based on changing conditions. In a non-limiting example, the system may provide a rule anomaly simulation engine to allow users to simulate scenarios based on different data inputs. In some embodiments, this allows fine-tuning of the models and engines for enhancing performance based on new rules data and operational data.

As shown in block 1204, the process flow 1200 may include the step of updating the AI engine based on the control signals. In some embodiments, the system may incorporate the changes selected by the user into the AI engine. The updates to the AI engine may be incorporated into a test environment version of the AI engine and/or incorporated into a production environment version of the AI engine, according to some embodiments.

As shown in block 1206, the process flow 1200 may include the step of modifying the vulnerability matrix. Based on the changes to the AI engine, the system may re-execute the threat analyses, as described in any of the process flows 400-1100 described herein, and modify the vulnerability matrix, in some embodiments. In such a configuration, the system may generate revised alerts based on any updates to the vulnerability matrix based on the revised AI engine.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for vulnerability detection and mitigation using artificial intelligence in an electronic environment, the system comprising:

a memory device with computer-readable program code stored thereon;

at least one processing device, wherein executing the computer-readable program code is configured to cause the at least one processing device to:

receive data from at least one data source;

generate at least one vulnerability attribute of a network device based on at least the data;

apply the vulnerability attribute to an artificial intelligence (AI) engine;

assign, by the AI engine, at least one weight to the vulnerability attribute of the network device;

generate, by the AI engine, a vulnerability matrix of the network device based on the at least one weight;

receive network data packets, wherein the network data packets comprise aggregated vulnerability data;

determine, using the AI engine, rule anomalies based on at least the aggregated vulnerability data;

create, using the AI engine, a prioritized hierarchy of the rule anomalies based on the vulnerability matrix, wherein the vulnerability matrix comprises vulnerability criteria and a vulnerability threshold; and generate, using the AI engine, a vulnerability matrix remediation based on the prioritized hierarchy of rule anomalies.

2. The system of claim 1, wherein the data comprises at least one of a compliance data or a regulatory data associated with at least one of network criteria, application criteria, infrastructure criteria, or policy criteria.

3. The system of claim 1, wherein executing the computer-readable program code is further configured to cause the at least one processing device to:

generate a forecast engine, wherein the forecast engine comprises a forecast machine learning model;

update the forecast engine with the data and the vulnerability matrix; and generate, using the forecast engine, a vulnerability forecasting map.

4. The system of claim 1, wherein executing the computer-readable program code is further configured to cause the at least one processing device to:

identify, using a natural language processing (NLP) model, regulatory parameters associated with the data;

extract operational data from at least one internal database;

generate, using a machine learning (ML) model, a rule threat map based on the regulatory parameters and the operational data; and determine, using the AI engine, remediation recommendations based on the rule threat map.

5. The system of claim 1, wherein executing the computer-readable program code is further configured to cause the at least one processing device to:

receive at least one historical dataset;

train the AI engine based on at least one historical dataset, wherein the at least one historical dataset comprises at least one of historical regulatory parameters associated with historical compliance data, historical vulnerability attributes associated with the network device, historical operational objectives associated with historical operational data, historical weights associated with historical vulnerability attributes, or historical vulnerability matrices;

receive the aggregated vulnerability data;

update the at least one historical dataset with the aggregated vulnerability data; and retrain the AI engine based on the aggregated vulnerability data.

6. The system of claim 1, wherein executing the computer-readable program code is further configured to cause the at least one processing device to:

execute the vulnerability matrix remediation;

determine, using the AI engine, a confidence threshold associated the vulnerability matrix remediation;

compare the confidence threshold to the vulnerability threshold to determine a rule anomaly remediation score; and update the vulnerability matrix with the confidence threshold associated with the vulnerability matrix remediation.

7. The system of claim 1, wherein executing the computer-readable program code is further configured to cause the at least one processing device to:

identify, using the AI engine, a rule vulnerability attribute based on the data;

identify, using the AI engine, an operational vulnerability attribute;

assign, using the AI engine, a rule vulnerability weight for the rule vulnerability attribute and an operational weight for the operational vulnerability attribute; and generate, using the AI engine, a composite vulnerability weight based on the rule vulnerability weight and the operational weight.

8. The system of claim 1, wherein executing the computer-readable program code is further configured to cause the at least one processing device to:

generate a user interface on a display, wherein the user interface comprises at least one interactive dashboard; and generate at least one alert based on the vulnerability matrix.

9. The system of claim 1, wherein executing the computer-readable program code is further configured to cause the at least one processing device to:

receive control signals from a user device, wherein the control signals comprise a revised mode of the AI engine, a second vulnerability attribute, and a second weight;

update the AI engine based on the control signals; and modify the vulnerability matrix.

10. A computer program product for vulnerability detection and mitigation using artificial intelligence in an electronic environment, wherein the computer program product comprises at least one non-transitory computer-readable medium having computer-readable program code portion embodied therein, the computer-readable program code portions which when executed by a processing device are configured to cause a processor to:

receive data from at least one data source;

generate at least one vulnerability attribute of a network device based on at least the data;

apply the vulnerability attribute to an artificial intelligence (AI) engine;

assign, by the AI engine, at least one weight to the vulnerability attribute of the network device;

generate, by the AI engine, a vulnerability matrix of the network device based on the at least one weight;

receive network data packets, wherein the network data packets comprise aggregated vulnerability data;

determine, using the AI engine, rule anomalies based on at least the aggregated vulnerability data;

create, using the AI engine, a prioritized hierarchy of the rule anomalies based on the vulnerability matrix, wherein the vulnerability matrix comprises vulnerability criteria and a vulnerability threshold; and generate, using the AI engine, a vulnerability matrix remediation based on the prioritized hierarchy of rule anomalies.

11. The computer program product of claim 10, wherein the data comprises regulatory data associated with at least one of network criteria, application criteria, infrastructure criteria, and policy criteria.

12. The computer program product of claim 10, wherein the processing device is further configured to:

generate a forecast engine, wherein the forecast engine comprises a forecast machine learning model;

update the forecast engine with the data and the vulnerability matrix; and generate, using the forecast engine, a vulnerability forecasting map.

13. The computer program product of claim 10, wherein the processing device is further configured to:

identify, using a natural language processing model, regulatory parameters associated with the data;

extract operational data from at least one internal database;

generate, using a machine learning (ML) model, a rule threat map based on the regulatory parameters and the operational data; and determine, using the AI engine, remediation recommendations based on the rule threat map.

14. The computer program product of claim 10, wherein the processing device is further configured to:

identify, using the AI engine, a rule vulnerability attribute based on the data;

identify, using the AI engine, an operational vulnerability attribute;

assign, using the AI engine, a rule vulnerability weight for the rule vulnerability attribute and an operational weight for the operational vulnerability attribute; and generate, using the AI engine, a composite vulnerability weight based on the rule vulnerability weight and the operational weight.

15. The computer program product of claim 10, wherein the processing device is further configured to:

execute the vulnerability matrix remediation;

determine, using the AI engine, a confidence threshold associated the vulnerability matrix remediation;

compare the confidence threshold to the vulnerability threshold to determine a rule anomaly remediation score; and update the vulnerability matrix with the confidence threshold associated with the vulnerability matrix remediation.

16. The computer program product of claim 10, wherein the processing device is further configured to:

receive control signals from a user device, wherein the control signals comprise a revised mode of the AI engine, a second vulnerability attribute, and a second weight;

update the AI engine based on the control signals; and modify the vulnerability matrix.

17. A computer-implemented method for vulnerability detection and mitigation using artificial intelligence in an electronic environment:

receiving data from at least one data source;

generating at least one vulnerability attribute of a network device based on at least the data;

applying the vulnerability attribute to an artificial intelligence (AI) engine;

assigning, by the AI engine, at least one weight to the vulnerability attribute of the network device;

generating, by the AI engine, a vulnerability matrix of the network device based on the at least one weight;

receiving network data packets, wherein the network data packets comprise aggregated vulnerability data;

determining, using the AI engine, rule anomalies based on at least the aggregated vulnerability data;

creating, using the AI engine, a prioritized hierarchy of the rule anomalies based on the vulnerability matrix, wherein the vulnerability matrix comprises vulnerability criteria and a vulnerability threshold; and generating, using the AI engine, a vulnerability matrix remediation based on the prioritized hierarchy of rule anomalies.

18. The computer-implemented method of claim 17, wherein the computer-implemented method is further configured for:

identifying, using a natural language processing model, regulatory parameters associated with the data;

extracting operational data from at least one internal database;

generating, using a machine learning (ML) model, a rule threat map based on the regulatory parameters and the operational data; and determining, using the AI engine, remediation recommendations based on the rule threat map.

* * * * *